(12) United States Patent
Matsumoto et al.

(10) Patent No.: US 8,564,648 B2
(45) Date of Patent: Oct. 22, 2013

(54) IMAGE SIGNAL PROCESSING APPARATUS, IMAGE SIGNAL PROCESSING METHOD, RECORDING MEDIUM, AND INTEGRATED CIRCUIT

(75) Inventors: Keizo Matsumoto, Okayama (JP); Hiroshi Miyai, Hyogo (JP); Katsuo Saigo, Hyogo (JP); Masanobu Inoe, Okayama (JP); Seiji Nakazawa, Osaka (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 12/875,171

(22) Filed: Sep. 3, 2010

(65) Prior Publication Data

US 2011/0134228 A1 Jun. 9, 2011

(30) Foreign Application Priority Data

Sep. 7, 2009 (JP) ................................. 2009-205470

(51) Int. Cl.
*H04N 13/04* (2006.01)
(52) U.S. Cl.
USPC .......................................................... 348/55
(58) Field of Classification Search
None
See application file for complete search history.

(56) References Cited

U.S. PATENT DOCUMENTS

| | | | | |
|---|---|---|---|---|
| 6,448,952 B1 * | 9/2002 | Toyoda et al. | ................... | 345/97 |
| 6,456,432 B1 * | 9/2002 | Lazzaro et al. | ................ | 359/464 |
| 6,573,928 B1 * | 6/2003 | Jones et al. | ..................... | 348/51 |
| 6,977,629 B2 | 12/2005 | Weitbruch et al. | | |
| 7,832,869 B2 * | 11/2010 | Maximus et al. | ................. | 353/7 |
| 8,194,058 B2 * | 6/2012 | Shestak et al. | ................. | 345/204 |
| 2001/0043266 A1 * | 11/2001 | Robinson et al. | ............... | 348/53 |
| 2003/0117489 A1 * | 6/2003 | Jones et al. | ..................... | 348/51 |
| 2009/0167845 A1 * | 7/2009 | Khan | .............................. | 348/51 |
| 2009/0322861 A1 * | 12/2009 | Jacobs et al. | .................... | 348/53 |
| 2010/0079585 A1 * | 4/2010 | Nemeth et al. | .................. | 348/54 |
| 2010/0177174 A1 * | 7/2010 | Ko et al. | ......................... | 348/56 |

FOREIGN PATENT DOCUMENTS

| | | |
|---|---|---|
| JP | 2001-054142 | 2/2001 |
| JP | 2001-054143 | 2/2001 |
| JP | 2001-258052 | 9/2001 |
| JP | 2009-031523 | 2/2009 |
| JP | 2009-031524 | 2/2009 |

* cited by examiner

*Primary Examiner* — Joseph Ustaris
*Assistant Examiner* — Zhubing Ren
(74) *Attorney, Agent, or Firm* — Wenderoth, Lind & Ponack, L.L.P.

(57) ABSTRACT

An image signal processing apparatus outputs, alternately on a-per frame basis, a first image to be displayed to one of left and right eyes of a viewer and a second image to be displayed to the other eye, and transmits, to a pair of image viewer glasses, a synchronizing signal for controlling timing of opening and closing of optical filters so as to allow the viewer to see the output frames through corresponding eyes. Specifically, the apparatus includes: a persistence amount detecting unit which detects a persistence amount indicating an effect of a first frame in the first image on a second frame in the second image and immediately following the first frame; and an optical-filter adaptive control unit which generates the synchronizing signal indicating timing of opening and closing of the optical filter corresponding to the second frame. The timing is changed based on the persistence amount detected.

1 Claim, 24 Drawing Sheets

IMAGE SIGNAL PROCESSING APPARATUS, IMAGE SIGNAL PROCESSING METHOD, RECORDING MEDIUM, AND INTEGRATED CIRCUIT

BACKGROUND OF THE INVENTION (1) Field of the Invention

The present invention relates to an image signal processing apparatus, an image display device, and an image signal processing method, and relates particularly to techniques to suitably reduce crosstalk, which poses a problem when images are displayed.

(2) Description of the Related Art

Patent Reference 1 (Japanese Unexamined Patent Application Publication No. 2001-258052) discloses a technique which an image display device uses to cancel out crosstalk between left and right images. According to Patent Reference 1, before a process of crosstalk cancellation, a left-eye image signal and a right-eye image signal are compared in order to extract an image area having a difference therebetween, and then a process of decreasing contrast is performed on the image signals indicating the image area. Subsequently, on the image signals subjected to the process, crosstalk cancellation is performed to cancel predetermined crosstalk between the left and right image signals.

The conventional crosstalk cancellation process disclosed in Patent Reference 1 facilitates improvement of effect of crosstalk cancellation to reduce crosstalk even in approximately black images, where crosstalk tends to be noticeable. Specifically, first, an image region having a large signal level difference is extracted based on difference between left and right image signals in the signal level. Then, the level of an image signal which corresponds to the extracted region and has a higher level than the other image signal is lowered, and the level of the other image signal, which has a lower level, is raised. Contrast between left and right signals is thus suppressed, so that crosstalk is cancelled.

However, this crosstalk cancellation is performed through a predetermined process regardless of characteristics of images. Such crosstalk cancellation may be unsuitable for characteristics of some images.

SUMMARY OF THE INVENTION

The present invention, conceived to address the problem, has an object of providing an image signal processing apparatus, an image display device, and an image signal processing method which allow for more suitable crosstalk cancellation.

The image signal processing apparatus according to an aspect of an embodiment of the present invention alternately outputs frames included in a first image to be displayed to one of a left eye and a right eye of a viewer and frames included in a second image to be displayed to the other one of the left eye and the right eye, and transmits, to a pair of image viewer glasses, a synchronizing signal for controlling timing of opening and closing of optical filters of the pair of image viewer glasses so as to allow the viewer to see each of the output frames through a corresponding one of the left eye and the right eye, the optical filters opening and closing independently from each other and each facing a corresponding one of the left eye and the right eye of the viewer. Specifically, the image signal processing apparatus according to the aspect of the present invention includes a persistence amount detecting unit configured to detect a persistence amount indicating an effect of a first frame on a second frame output immediately after the first frame, the first frame being included in the first image, and the second frame being included in the second image; and an optical-filter adaptive control unit configured to generate the synchronizing signal indicating timing of opening and closing of the optical filter corresponding to the second frame, the timing being changed based on the persistence amount detected by the persistence amount detecting unit.

The image signal processing apparatus prevents crosstalk which remains even after signal processing from being shown to the viewer, by changing timing of opening and closing optical filters depending on the persistence amount in the configuration described above. As a result, the viewer has images with less crosstalk.

Furthermore, the optical-filter adaptive control unit may be configured to makes a length of delay in the timing of opening of the optical filter with respect to timing of outputting of the second frame longer for a larger persistence amount which is detected by the persistence amount detecting unit. With this, the image signal processing apparatus prevents an frame from being shown to the viewer during a period in which the frame is greatly affected by the persistence of the frame immediately before the frame.

Furthermore, the optical-filter adaptive control unit may be configured to determine a target length of delay in the timing of opening of the optical filter based on the persistence amount, and gradually increase the length of delay in the timing of opening of the optical filter at every output of the frame until the length of delay reaches the target length of delay. In addition, the optical-filter adaptive control unit may be configured to set, for a longer target length of delay, a larger value as the number of frames to be output until the length of delay reaches the target length of delay. This prevents abrupt change in timing of opening and closing of optical filters, thus reducing an uncomfortable feeling of the viewer.

In one aspect of an embodiment of the present invention, the persistence amount detection unit may be configured to detect, as the persistence amount, an accumulated value obtained by accumulating, on a per-frame basis, absolute values of results of subtracting pixel values of pixels of the first frame from pixel values of corresponding pixels of the second frame.

In another aspect of an embodiment of the present invention, the persistence amount detection unit may be configured to calculate, as the persistence amount, an accumulated value by accumulating, on a per-frame basis, absolute values of values smaller than a predetermined threshold among values resulting from subtracting pixel values of pixels of the first frame from pixel values of corresponding pixels of the second frame.

Furthermore, the image signal processing apparatus may further include a crosstalk cancelling unit configured to reduce persistence between the first frame and the second frame. The persistence amount detection unit may be configured to detect an amount of the persistence remaining in the second frame after the reduction of the persistence by the crosstalk cancelling unit.

Furthermore, the persistence amount detection unit may be configured to calculate, as the persistence amount, an accumulated value by accumulating absolute values of values smaller than a predetermined threshold among pixel values of respective pixels of the second frame after the reduction of the persistence by the crosstalk cancelling unit.

Furthermore, the optical-filter adaptive control unit may be configured to separately generate a synchronizing signal corresponding to the first frame based on the persistence amount corresponding to the first frame, and a synchronizing signal corresponding to the second frame based on the persistence amount corresponding to the second frame.

Furthermore, the image signal processing apparatus may further include an image characteristics information detecting unit configured to detect image characteristics information based on at least one of the first image and the second image. The optical-filter adaptive control unit may be configured to generate the synchronizing signal indicating timing of opening and closing of the optical filters, the timing being changed based on the persistence amount and the image characteristics information.

Furthermore, in the case where the image characteristics information detected by the image characteristics information detecting unit exceeds a predetermined threshold, the optical-filter adaptive control unit may be configured to generate the synchronizing signal indicating timing of opening and closing of the optical filters, the timing being changed based on the persistence amount.

In the case where the image characteristics information exceeds the threshold, that is, where optical-filter adaptive control unit detects a scene change, there is a possibility that a large change has occurred in the persistence amount between consecutive frames. Changing the timing of opening and closing optical filters based on the persistence amount at the time of the scene change may allow the viewer to view an image with less crosstalk.

Furthermore, the optical-filter adaptive control unit may be configured to determine an amount of change between scenes based on the image characteristics information. Here, the optical-filter adaptive control unit may be configured to set, for a larger amount of change, a smaller value as the number of frames to be output until the length of delay reaches the target length of delay.

Furthermore, the image characteristics information detecting unit may be configured to detect, as the image characteristics information, information on a scene of at least one of the first image and the second image.

Furthermore, the optical-filter adaptive control unit may be configured to generate the synchronizing signal based on change in the persistence amount between scenes of at least one of the first image and the second image.

An image display device according to an aspect of an embodiment of the present invention includes: the image signal processing apparatus; a display unit configured to display the first image and the second image; and a synchronizing signal output unit configured to output a synchronizing signal generated by the optical-filter adaptive control unit.

An image signal processing method according to an aspect of an embodiment of the present invention is a method for alternately outputting frames included in a first image to be displayed to one of a left eye and a right eye of a viewer and frames included in a second image to be displayed to the other one of the left eye and the right eye, and transmitting, to a pair of image viewer glasses, a synchronizing signal for controlling timing of opening and closing of optical filters of the pair of image viewer glasses so as to allow the viewer to see each of the output frames through a corresponding one of the left eye and the right eye, the optical filters opening and closing independently from each other and each facing a corresponding one of the left eye and the right eye of the viewer. Specifically, the method includes: detecting a persistence amount indicating an effect of a first frame on a second frame output immediately after the first frame, the first frame being included in the first image, and the second frame being included in the second image; and generating the synchronizing signal indicating timing of opening and closing of the optical filter corresponding to the second frame, the timing being changed based on the persistence amount detected in the detecting.

A non-transitory computer-readable recording medium according to an aspect of an embodiment of the present invention has a program thereon for causing a computer to alternately output frames included in a first image to be displayed to one of a left eye and a right eye of a viewer and frames included in a second image to be displayed to the other one of the left eye and the right eye, and transmit, to a pair of image viewer glasses, a synchronizing signal for controlling timing of opening and closing of optical filters of the pair of image viewer glasses so as to allow the viewer to see each of the frames through a corresponding one of the left eye and the right eye, the optical filters opening and closing independently from each other and each facing a corresponding one of the left eye and the right eye of the viewer. Specifically, the non-transitory computer-readable recording medium has a program recorded thereon for causing the computer to execute detecting a persistence amount indicating an effect of a first frame on a second frame output immediately after the first frame, the first frame being included in the first image, and the second frame being included in the second image; and generating the synchronizing signal indicating timing of opening and closing of the optical filter corresponding to the second frame, the timing being changed based on the persistence amount detected in the detecting.

An integrated circuit according to an aspect of an embodiment of the present invention alternately outputs frames included in a first image to be displayed to one of a left eye and a right eye of a viewer and frames included in a second image to be displayed to the other one of the left eye and the right eye, and transmits, to a pair of image viewer glasses, a synchronizing signal for controlling timing of opening and closing of optical filters of the pair of image viewer glasses so as to allow the viewer to see each of the frames through a corresponding one of the left eye and the right eye, the optical filters opening and closing independently from each other and each facing a corresponding one of the left eye and the right eye of the viewer. Specifically, the integrated circuit includes: a persistence amount detecting unit configured to detect a persistence amount indicating an effect of a first frame on a second frame output immediately after the first frame, the first frame being included in the first image, and the second frame being included in the second image; and an optical-filter adaptive control unit configured to generate the synchronizing signal indicating timing of opening and closing of the optical filter corresponding to the second frame, the timing being changed based on the persistence amount detected by the persistence amount detecting unit.

The invention described above allows for suitable crosstalk cancellation to display preferable images in comparison with conventional techniques.

FURTHER INFORMATION ABOUT TECHNICAL BACKGROUND TO THIS APPLICATION

The disclosure of Japanese Patent Application No. 2009-205470 filed on Sep. 7, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DETAILED DESCRIPTION OF THE INVENTION (Embodiment 1)
<1. Configuration of Image Display System>

An image display system (typically, a video display system) according to an embodiment of the present invention includes: an image display device composed of a display unit having a plurality of pixels, and an image signal processing unit (image signal processing apparatus); and a pair of image viewer glasses. On the display unit of the image display device, a first image (typically, a video) shown to one of a left eye and a right eye of a viewer and a second image (typically, a video) shown to the other eye are alternately displayed on a per-frame basis. The pair of image viewer glasses includes optical filters, one of which faces the left eye of the viewer and the other faces the right eye, and which open and close independently form each other. The pair of image viewer glasses controls the timing of opening and closing of the optical filters in a manner such that each of the frames displayed on the display unit is shown only to a corresponding one of the eyes of the viewer. On the other hand, the image signal processing apparatus transmits the first and second images to the image display device and a synchronizing signal for controlling the timing of opening and closing of the optical filters to the pair of image viewer glasses.

Figure 1:
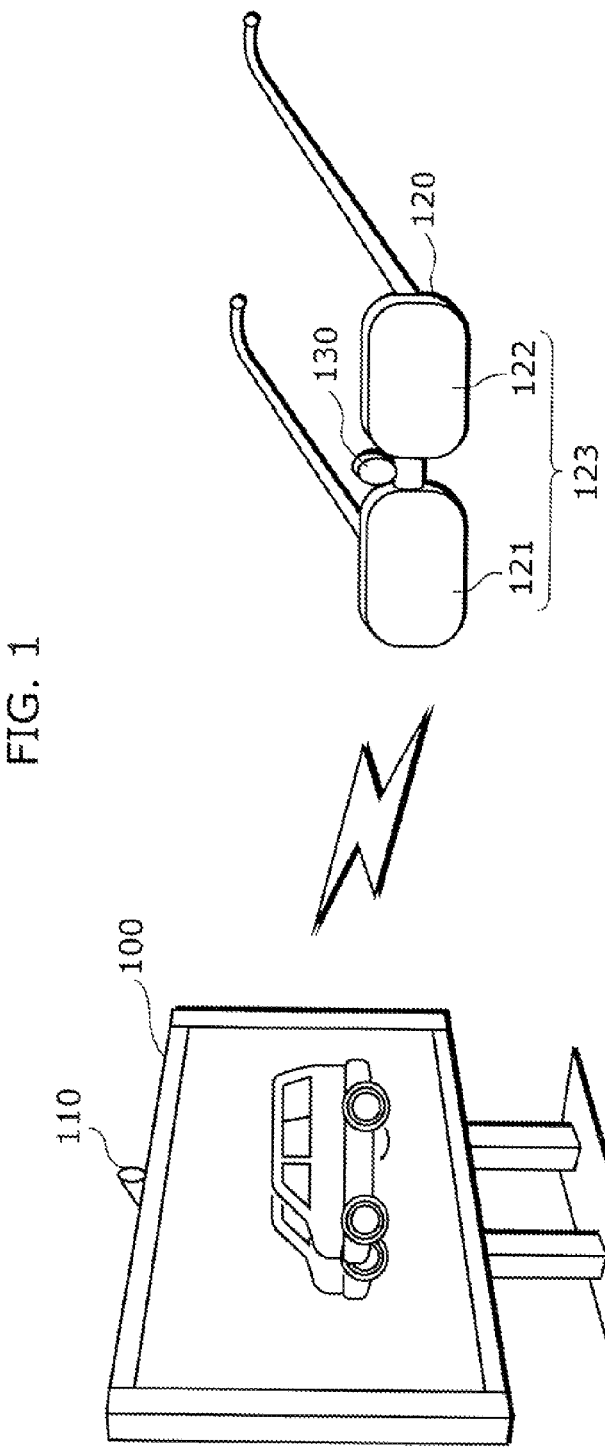
FIG. 1 shows a schematic configuration of an image display system including an image display device and a pair of image viewer glasses.

FIG. 1 shows an image display system including an image display device 100 and a pair. of image viewer glasses 120 to be used for viewing images displayed on the image display device 100. Embodiment 1 will describe an exemplary case where a viewer has a stereoscopic image by viewing images displayed on the image display device 100 through the pair of image viewer glasses 120.

In the image display system described in Embodiment 1, the image display device 100 displays a left-eye image and a right-eye image alternately on a per-frame basis, at a frequency of, for example, 120 Hz. The pair of image viewer glasses 120 controls light entering the left glass of the pair of image viewer glasses 120 and light entering the left glass using optical filters 123 in synchronization with the images displayed on the image display device 100. The left-eye image and the right-eye image displayed on the image display device 100 differ by parallax. The viewer perceives simulated parallax of the images through the left and right eyes so that the viewer views the images displayed on the image display device 100 as a stereoscopic image.

More specifically, the image display device 100 displays, on its display surface, images which have been subjected to predetermined processes such as a stereoscopic (3-D imaging) process. The image display device 100 transmits, from a synchronizing signal transmitting unit 110, a synchronizing signal for synchronization with the images displayed on the display surface of the image display device 100. The pair of image viewer glasses 120 receives the synchronizing signal from the synchronizing signal transmitting unit 110 through a synchronizing signal receiving unit 130. Based on the synchronizing signal, the pair of image viewer glasses 120 performs a predetermined optical process on the light entering the glasses.

The optical process is, for example, opening and closing an optical filter 122 of the left glass and an optical filter 121 of the right glass, that is, optical filters 123 of the glasses in synchronization with the synchronizing signal from the synchronizing signal transmitting unit 110. Specifically, when the display surface displays a left-eye image, the optical filters 123 blocks (or reduces) light entering the right glass of the pair of image viewer glasses 120 and transmits (or increases) light entering the left glass of the pair of image viewer glasses 120. When the display surface shows a right-eye image, the optical filters 123 perform the above operations with left and right reversed.

Such control of the optical filters 123 in synchronization with images allows the viewer to view the left-eye image through the left eye, and the right-eye image through the right eye. The viewer wearing the pair of image viewer glasses 120 therefore views the images as a stereoscopic image.

It is to be noted that the display frequency is not limited to the one in the above case where the left-eye image and the right-eye image are each displayed at a display frequency of 120 Hz. For example, a display frequency of 96 Hz, 100 Hz, or 144 Hz may be used. The display frequency may be dependent on the type of an image to be displayed.

<2. Crosstalk>

Figure 2:
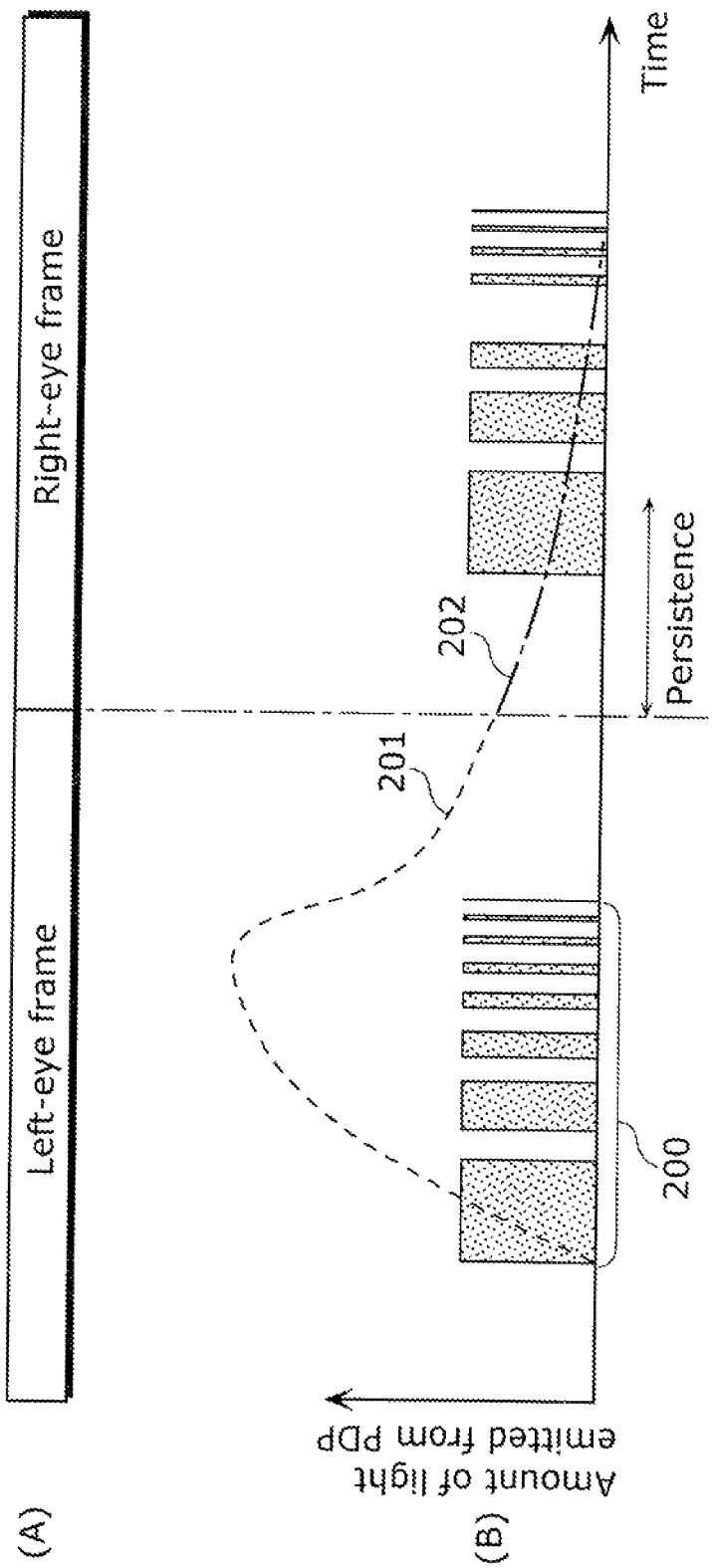
FIG. 2 is a drawing illustrating the phenomenon of persistence (crosstalk)

FIG. 2 shows an exemplary operation of the image display device 100 displaying images using a subfield drive as used in plasma display panels (PDPs). The image display device 100 alternately displays, on its display surface, a left-eye image (left-eye frame) and a right-eye image (right-eye frame) in temporal sequence. In this case, each of the images is displayed on the display surface using a combination of subfields. In the example shown in FIG. 2, subfields 200 are combined to display the left-eye frame.

However, after starting control for light emission of a subfield (control for image display), there is a temporal delay until phosphors of pixels to which voltage is applied actually discharge and start emitting light. The delay depends on response characteristics of the phosphors or other factors. Because of the delay, even when control of light emission is performed as indicated by the subfields 200, actual light emission lags the control as indicated by the graph curve 201.

Similarly, when the light is turned off, there is persistence due to the characteristics of the phosphors. The persistence is dependent on the amount of emitted light and exponentially decays with time. Referring to FIG. 2, even after the control of light emission of the subfields 200 is finished and the display period of the left-eye frame has elapsed, the persistence of the left-eye frame may remain as shown in a graph curve 202. As a result, the persistence of the left-eye frame remains in the display period of the right-eye frame which follows the left-eye frame. When a viewer views the image, the viewer has double images such as ghosting, in which the image in the left-eye frame remains in the right-eye frame. This is a phenomenon called crosstalk.

Although the subfield drive of PDPs is described above as an example of a method of driving a display, the present invention is not limited to this. The present invention is applicable to cases of any other display methods in which persistence components cause crosstalk.

<3. Configuration of Image Display Device>

Figure 3:
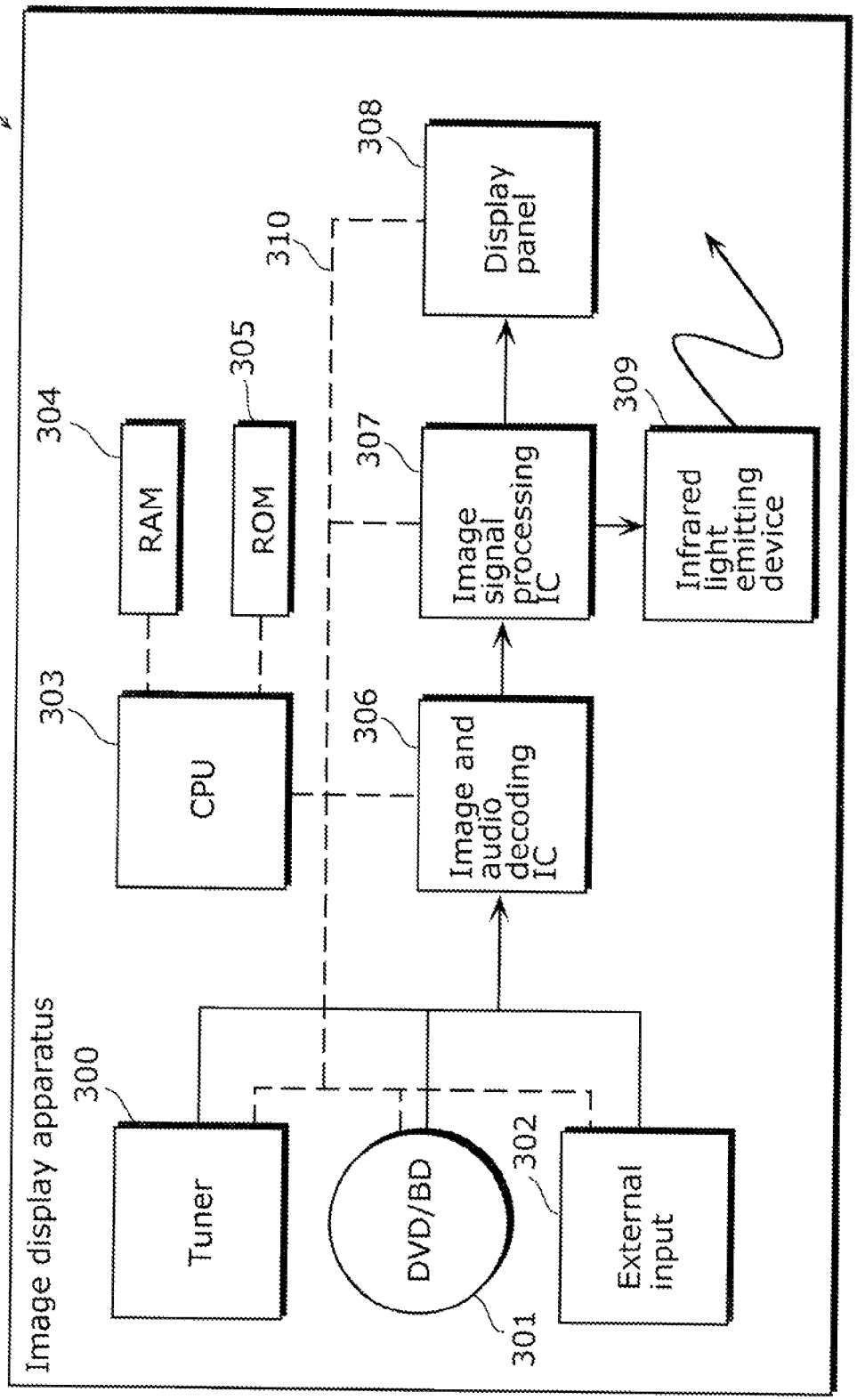
FIG. 3 shows an exemplary hardware configuration of the image display device.

FIG. 3 shows a hardware configuration of the image display device 100 described in Embodiment 1. The image display device 100 includes a tuner 300, a DVD/BD 301, an external input 302, a CPU 303, a RAM 304, a ROM 305, an image and audio decoding IC 306, an image signal processing IC 307, a display panel 308, an infrared light emitting device 309, and a bus 310.

The tuner 300 demodulates a broadcast wave received through an antenna (not shown). The tuner 300 sends broadcast data resulting from the demodulation to the image and audio decoding IC 306.

The DVD/BD 301 is an optical disc on which image data and the like are previously recorded, such as a digital versatile disc (DVD) or a Blu-ray Disc (BD). The image data read out of the DVD/BD 301 is sent to the image and audio decoding IC 306. It is to be noted that the optical disc may be an optical disc storage medium other than the DVD or the BD illustrated above. Furthermore, not only optical discs but also magnetic recording disks such as hard disks, and media other than discoid media, such as a tape device or a semiconductor recording device, are also applicable. That is, any type of medium can be used as long as content data can be recorded thereon.

The external input 302 functions as an interface in the case where the image display device 100 receives image data transmitted by wire or wireless communication from outside the apparatus. In this case, the image data received from outside the apparatus is sent to the image and audio decoding IC 306.

Although Embodiment 1 is described using the tuner 300, the DVD/BD 301, and the external input 302 as an example, the present invention is not limited to this. Image data may be provided in a manner other than described above.

The CPU 303 has overall control of the image display device 100. The CPU 303 reads a program for the control out of the ROM 305, and executes the program while temporally storing parameters necessary for the execution of the program in the RAM 304. The CPU 303 is connected to the other major components via the bus 310 and controls the components through the bus 310.

The RAM 304 is a volatile data storage unit. A representative example of the volatile data storage unit is a memory, such as a DRAM. The RAM 304 is used as a storage for parameters to be used in execution of the program by the CPU 303 or as a temporary storage for image data to be decoded by the image and audio decoding IC 306.

The ROM 304 is a non-volatile data storage unit. A representative example of the non-volatile data storage unit is a memory device, such as a ROM or a flash memory. The ROM 305 is used as a storage for a program to be executed by the CPU 303 or for set values related to an operation of the image display device 100. A non-volatile, rewritable semiconductor memory, such as a flash memory, may be used instead of the RAM.

The image and audio decoding IC 306 decodes image data and audio data provided from a source selected from among the above-mentioned tuner 300, DVD/BD 301, and external input 302. The image data and audio data to be provided to the image and audio decoding IC 306 are in a predetermined format. The image and audio decoding IC 306 decodes (or converts) the data in the predetermined format in order to allow the following components to handle the image data and the audio data. Representative examples of the predetermined format include Moving Picture Experts Group (MPEG)-2, MPEG-4, H.264, and Joint Photographic Experts Group (JPEG).

The image signal processing IC 307 performs predetermined image processing on the image data decoded by the image and audio decoding IC 306. The image processing includes color conversion for better color presentation on the display panel 308, which will be described later, and frame rate conversion from the frame rate of the decoded image data into a higher frame rate for finer presentation of movement in the image (change between frames). In addition to the processing, the image signal processing IC 307 generates and outputs a synchronizing signal when a stereoscopic image is displayed on the display panel 308 described later. The processing performed by the image signal processing IC 307 will be detailed later.

The display panel 308 displays an image represented by the image signal processed by the image signal processing IC 307. The display panel 308 may be a PDP, a liquid crystal display (LCD), a cathode ray tube (CRT), a surface-conduction electron-emitter display (SED), or the like. Embodiment 1 is not limited to any specific display methods of these displays.

The infrared light emitting device 309 outputs, to outside the apparatus, the synchronizing signal generated and output by the image signal processing IC 307. In Embodiment 1, the synchronizing signal is transmitted by infrared light. It is to be noted that Embodiment 1 is not limited to external transmission of the synchronizing signal by infrared light. The synchronizing signal may be externally transmitted using another transmission method, for example, by wireless communication or ultrasonic wave.

The bus 310 has a role of connecting the above-described components. With this, the CPU 303 has integrative control of the components so as to suitably control the image display device 100.

<4. Image Signal Processing>

Figure 4:
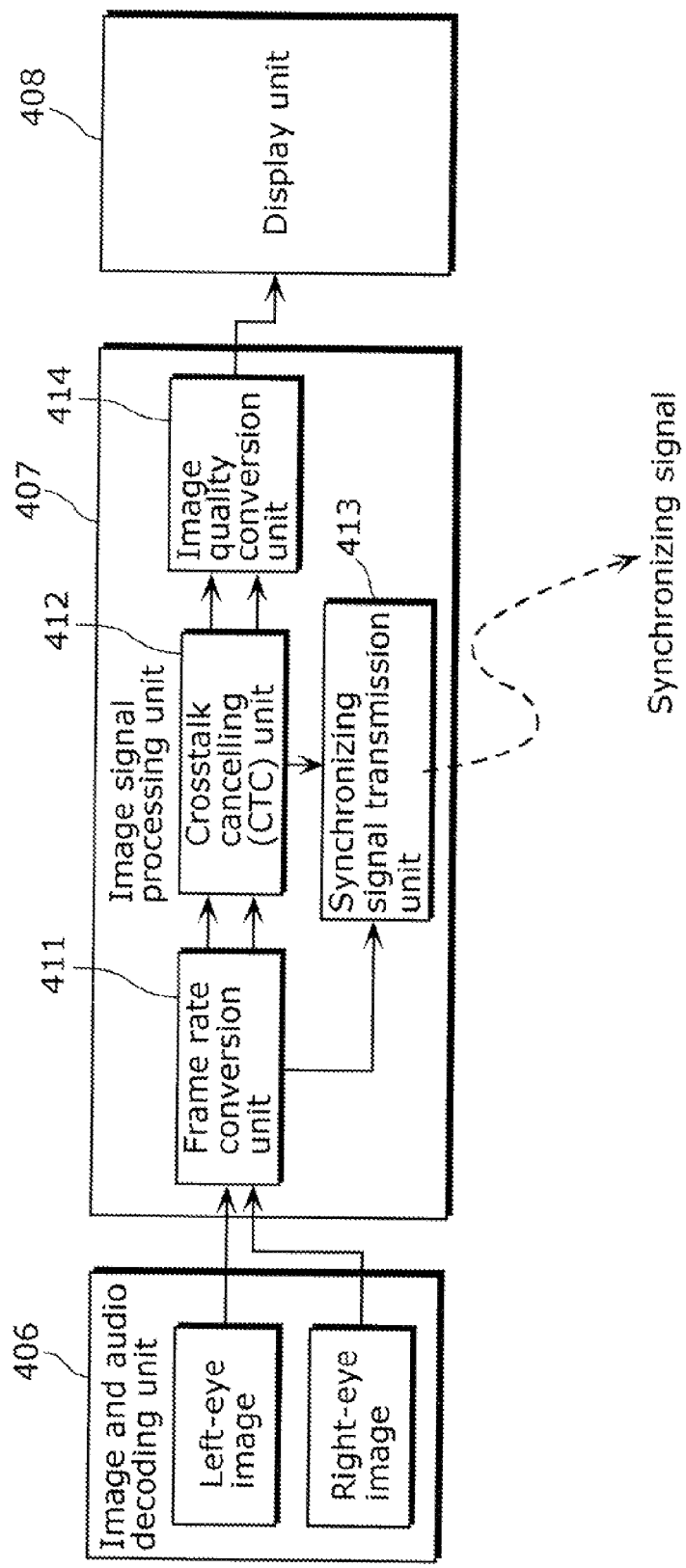
FIG. 4 shows an exemplary functional configuration of the image display device.

The following will describe processing of an image signal performed by the image signal processing IC 307 shown in FIG. 3 with reference to a functional configuration shown in FIG. 4.

An image and audio decoding unit 406 shown in FIG. 4 corresponds to the image and audio decoding IC 306 shown in FIG. 3. The image and audio decoding unit 406 decodes a left-eye image signal and a right-eye image signal. The left-eye image signal and the right-eye image signal decoded by the image and audio decoding unit 406 are provided to an image signal processing unit 407.

The display unit 408 corresponds to the display panel 308 shown in FIG. 3. The display unit 408 displays images on its display surface according to image signals processed by the image signal processing unit 407.

The image signal processing unit 407 corresponds to the image signal processing IC 307 and the infrared light emitting device 309 shown in FIG. 3. The image signal processing unit 407 includes a frame rate conversion unit 411, a crosstalk canceling (hereinafter referred to as CTC) unit 412, a synchronizing signal transmitting unit 413, and an image quality converting unit 414.

Figure 5:
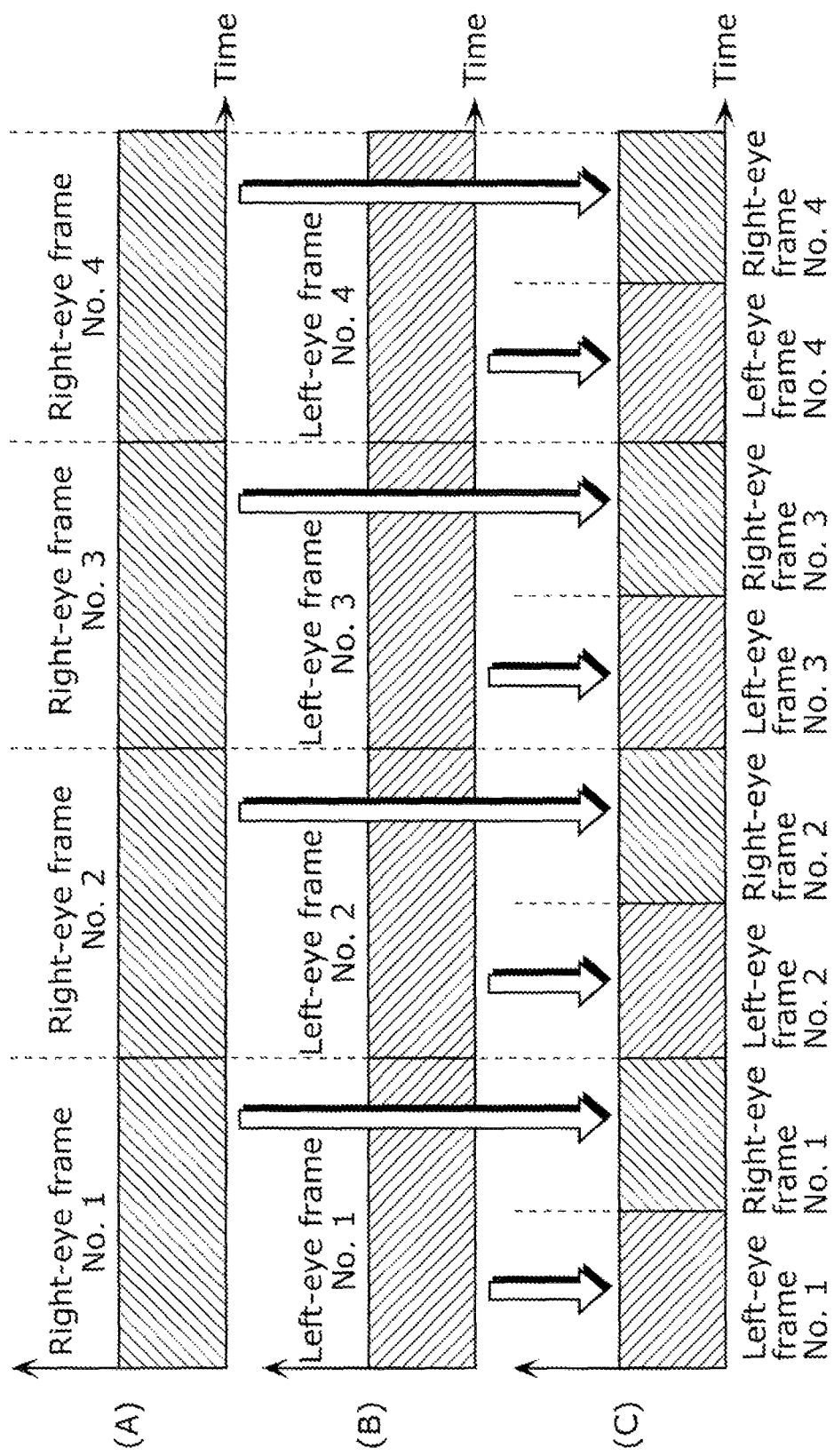
FIG. 5 shows an exemplary frame rate conversion.

The frame rate conversion unit 411 doubles frame rates indicated by the image signals for the left eye and the right eye decoded by the image and audio decoding unit 406. FIG. 5 shows to an exemplary process performed by the frame rate conversion unit 411. The frame rate conversion unit 411 processes the provided signals, that is, a right-eye frame signal ((A) in FIG. 5) and a left-eye frame signal ((B) in FIG. 5), so as to double frame rates indicated by the signals so that a set of one right-eye frame and one left-eye frame theoretically fits in one period at the original frame rate. Specifically, this is achieved by doubling the speed of processing of data constituting each of the frames.

In order to double the processing speed, a measure is taken such as causing the image signal processing IC 307 to perform the process at a double operation clock, or parallelizing internal processes of the image signal processing IC 307. The image signals are thus processed into such an image signal that the left and right images fit in the period at the original frame rate. The image signal output by the frame rate conversion unit 411 may be formatted in a manner such that one signal represents both of the left and right frames as shown in (C) of FIG. 5, or in a manner such that the frame rate (or the frequency of the clock signal) is doubled and the left image and the right image are individually output.

The frame rate conversion unit 411 preferably outputs, to the CTC unit 412, the image signal in a manner such that the left- and right-image signals included in the signal correspond to each others As illustrated in (C) of FIG. 5, frames are preferably output in a manner such that a right-eye frame is followed by a left-eye frame corresponding to the right-eye frame, that is, a left-eye frame which is displayed at the same time with the right-eye frame or within a predetermined time from the right-eye frame. That is, consecutive two frames are preferably ordered with a predetermined regularity. Alternatively, correspondence between the left-eye frame and the right-eye frame may be provided by a means other than the image signal.

The CTC unit 412 processes the image signals when images are displayed on the display unit 408, which is described later, so as to reduce persistence (crosstalk) which occurs at switching of left and right frames sequentially or every predetermined number of frames. The CTC 412 will be detailed later.

The synchronizing signal transmitting unit 413 transmits to outside the apparatus a synchronizing signal which is synchronized with the left and right frames on the basis of the frame rate generated by the frame rate conversion unit 411. Specifically, the synchronizing signal is transmitted to the pair of image viewer glasses 120 shown in FIG. 1. The pair of image viewer glasses 120 controls the left and right optical filters 123 according to the synchronizing signal to allow the viewer to view a 3D image.

The synchronizing signal may be transmitted by any medium, such as an optical means typified by infrared light, a wireless remote control (for example, ZigBee), a wireless communication means typified by Bluetooth, or a special communication cable. That is, any method can be used as long as the method allows for transmission of synchronization information between the image display device 100 and the pair of image viewer glasses 120. Embodiment 1 will describe the above-mentioned case where infrared light is used for the transmission as an example.

The image quality converting unit 414 modifies the image signals representing images to be displayed, in a manner depending on display characteristics of the display unit 408 in the following process. The image quality conversion unit 414 performs various processes on an image signal such as changing, based on an average picture level (APL), luminance of an image to be displayed by the image display device 100, converting the color gamut of an input signal to adjust it to the color gamut of the display device, and fine tuning of color information in a manner depending on display characteristics of the display unit 408.

Decoded image signals are subjected to various processes in the image signal processing unit 407 as described above, and a resulting, modified image signal is output to the display unit 408. This allows for displaying a preferable image.

<5. Configuration of Pair of Image Viewer Glasses>

Figure 6:
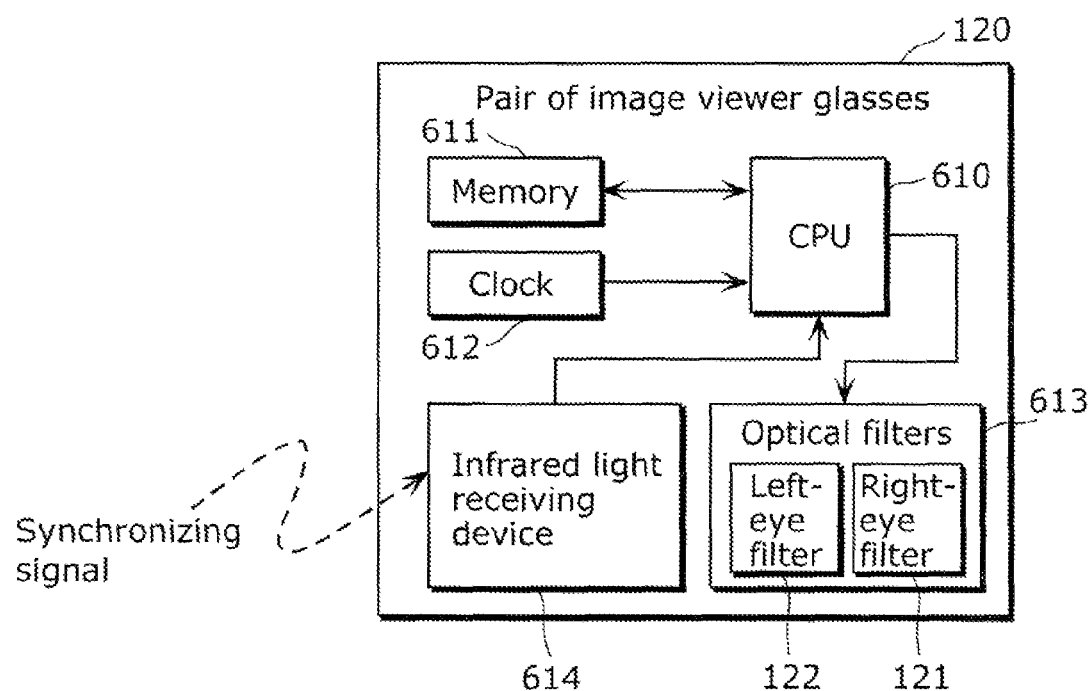
FIG. 6 shows an exemplary hardware configuration of the pair of image viewer glasses.

FIG. 6 shows an exemplary hardware configuration of the pair of image viewer glasses 120 shown in FIG. 1. Referring to FIG. 6, the pair of image viewer glasses 120 includes a CPU 610, a memory 611, a clock 612, optical filters 613, and an infrared light receiving device 614.

The CPU 610 has overall control of the pair of image viewer glasses 120. The CPU 610 controls the pair of image viewer glasses 120, particularly the optical filters 613 by executing a predetermined software program.

The memory 611 serves as a storage for the software program for operation of the CPU 610 or as a temporary storage to store parameters when the software program is executed by the CPU 610. The memory 611 may be a volatile memory, a non-volatile memory, or a combination of them. The memory 611 may be a storage medium other than a memory, such as a disk storage device.

The clock 612 generates a reference signal (clock signal) necessary for operation of the CPU 610 and so on. The clock 612 may include a quartz oscillator or an oscillator of another type. The clock signal generated by the clock 612 may be divided or multiplied before use.

The optical filters 613 are provided in front of the left eye and the right eye of the viewer wearing the pair of image viewer glasses 120, and adjust the amount and properties of light to enter the eyes. The optical filters 613 include the optical filter 122 for the left eye and an optical filter 121 for the right eye.

The infrared light receiving device 614 receives a synchronizing signal transmitted from outside the pair of image viewer glasses 120, particularly, the image display device 100. Since infrared light is used for an exemplary synchronizing signal in Embodiment 1, the Infrared light receiving device 614 is described here as an example. However, the present invention is not limited to this. In order to receive a synchronizing signal transmitted by a radio wave, a receiving unit (for example, an antenna and a tuner) is used for receiving the radio signal. That is, any type of receiving unit can be used as long as it is capable of properly receiving a synchronizing signal.

Figure 7:
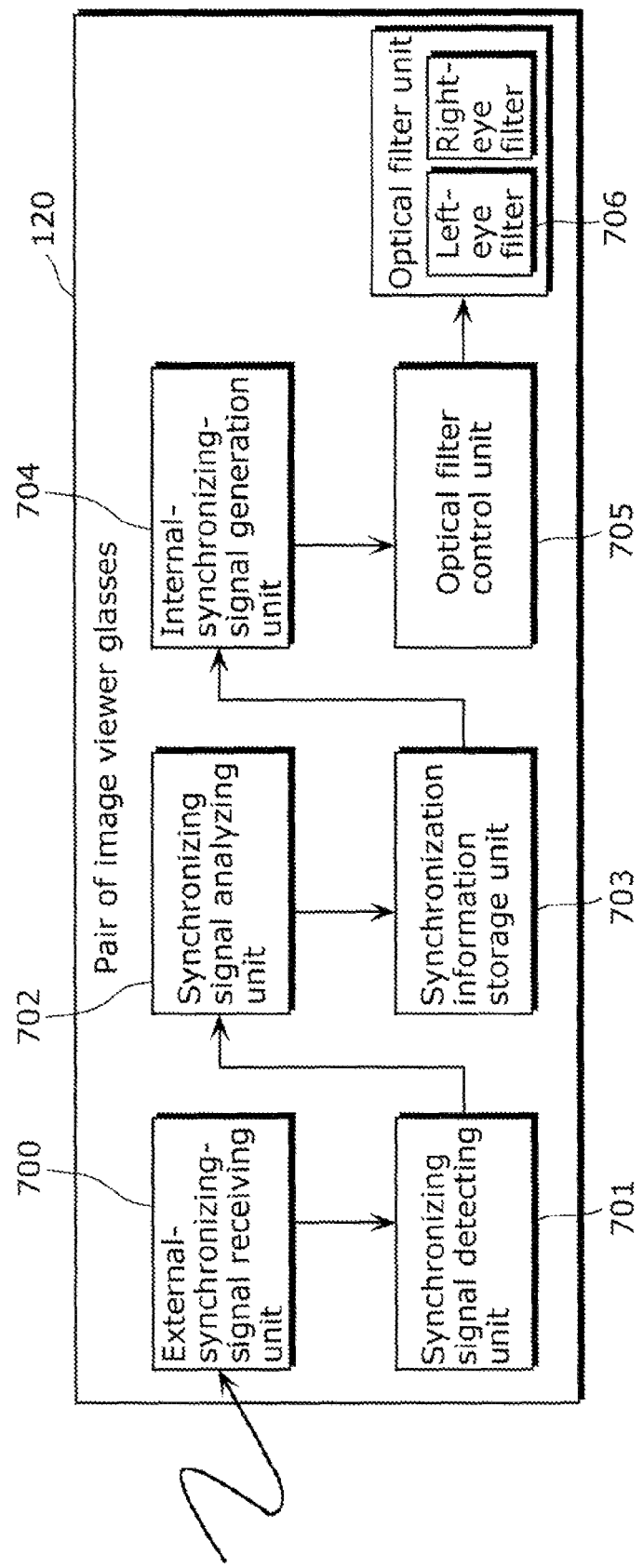
FIG. 7 shows an exemplary functional configuration of the pair of image viewer glasses.

FIG. 7 shows a functional configuration of the pair of image viewer glasses 120. The pair of image viewer glasses 120 includes an external-synchronizing-signal receiving unit 700, a synchronizing signal detecting unit 701, a synchronizing signal analyzing unit 702, a synchronization information storage unit 703, an internal-synchronizing-signal generation unit 704, an optical filter control unit 705, and an optical filter unit 706.

The external-synchronizing-signal receiving unit 700 receives a synchronizing signal transmitted from the image display device 100 by infrared light. The external-synchronizing-signal receiving unit 700 outputs an electric signal depending on the infrared light to the synchronizing signal detecting unit 701 described later. The external-synchronizing-signal receiving unit 700 corresponds to the infrared light receiving device 614 in the hardware configuration of FIG. 6. As with the hardware configuration shown in FIG. 6 as described above, a case where infrared light is used is described as an example, but a synchronizing signal may be transmitted and received using a method in which a medium other than infrared light is used. A radio wave may be used for the transmission and reception instead of infrared light.

The synchronizing signal detecting unit 701 detects the synchronizing signal, which is an electric signal generated from the infrared light received from the external-synchronizing-signal receiving unit 700. Specifically, the synchronizing signal detecting unit 701 detects a signal having a predetermined electric waveform as a synchronizing signal.

The synchronizing signal analyzing unit 702 analyzes the synchronizing signal detected by the synchronizing signal detecting unit 701 to determine information on time intervals with which the optical filter unit 706 described later is operated. The information on time intervals with which the optical filter unit 706 described later is operated is, for example, information on timing of opening and closing the left-eye optical filter 122 and the right-eye optical filter 121.

The synchronizing signal-detecting unit 701 and the synchronizing signal analyzing unit 702 correspond to part of the program executed by the CPU 610 in the hardware configuration shown in FIG. 6.

The synchronization information storage unit 703 stores control information on operations of the optical filter unit 706 determined by the synchronizing signal analyzing unit 702 through the analysis of the synchronizing signal. The synchronization information storage unit 703 corresponds to the memory 611 in the hardware configuration in shown in FIG. 6. The CPU 610 writes the information in the memory 611.

The internal-synchronizing-signal generation unit 704 generates a synchronizing signal inside the pair of image viewer glasses 120 based on the synchronization information stored in the synchronization information storage unit 703 or the synchronization information (the information on time intervals, for example) determined by the synchronizing signal analyzing unit 702 through the analysis. The internal-synchronizing-signal generation unit 704 corresponds to the CPU 610 and the clock 612 in the hardware configuration shown in FIG. 6.

The optical filter control unit 705 controls operation of the optical filter unit 706 including the optical filters 121 and 122 which respectively correspond to the left and right glasses of the pair of image viewer glasses 120. For example, the optical filter control unit 705 controls the amount of light which are transmitted by the optical filters 121 or the optical filter 122. The optical filter control unit 705 corresponds to the program executed by the CPU 610 to control the optical filters or a driving circuit to drive the optical filter unit 706, which is described later, in the hardware configuration shown in FIG. 6.

The optical filter unit 706 is provided to the two glasses of the pair of image viewer glasses 120, that is, provided at the positions facing the respective eyes of the viewer, and includes the optical filters 121 and 122 which adjust light to enter the left and right eyes. There are various types of optical filters, and properties of the light to be adjusted by the optical filters 121 and 122, such as the amount or the polarization, depend on the type of them. Liquid crystal devices may be used for the optical filters 121 and 122. The liquid crystal devices are controlled in order to adjust the amount of the light to be transmitted. The optical filter unit 706 corresponds to the optical filters 613 in the hardware configuration shown in FIG. 6.

In Embodiment 1, an example is described where the left-eye images and the right-eye image are alternately displayed on the image display device 100 on a-per frame basis. In operation of the optical filter unit 706, the left-eye optical filter 122 and the right-eye optical filter 121 take turns to perform a shutter-like operation to reduce and increase the amount of light to be transmitted by the filters.

That is, during a period when the image display device 100 displays a right-eye image, only the right-eye optical filter 121 transmits light (open state) and the left-eye optical filter 122 does not transmit light (close state). On the other hand, during a period when the image display device 100 displays a left-eye image, only the left-eye optical filter 122 transmits light (open state) and the right-eye optical filter 121 does not transmit light (close state).

Although Embodiment 1 is described using this case as an example, operation of the optical filter unit 706 is not limited to this. For example, the optical filter unit 706 may include optical filters which polarize light to the right eye in one direction and light to the left eye in another direction. That is, the pair of image viewer glasses 120 may be any type of optical filters which are capable of adjusting light to be transmitted in synchronization with displayed images.

The correspondence between the hardware configuration shown in FIG. 6 and the functional configuration shown in FIG. 7 is a concrete example for describing Embodiment 1, but the present invention is not limited to this example. Other hardware configurations or software configurations may be used instead.

Although the pair of image viewer glasses 120 described in Embodiment 1 generates an internal synchronizing signal based on the external synchronizing signal and operates the optical filter unit 706 according to the internal synchronizing signal, the pair of image viewer glasses 706 is not limited to this. The pair of image viewer glasses 120 may control the optical filter unit 706 directly according to the synchronizing signal externally received, without generating an internal synchronizing signal. In this case, the pair of image viewer glasses 120 is implemented with a relatively simple configuration.

<6. Crosstalk Cancel (CTC) Unit>

The CTC unit 412 calculates the amount of crosstalk leaking from a first frame included in the first image into a second frame included in the second image and output immediately after the first frame, and corrects the second frame to output using the calculated amount of the crosstalk. More specifically, the CTC unit 412 subtracts, from the second frame, persistence of the first frame remaining in the display period (light emission period) of the second frame in advance of output.

Figure 8:
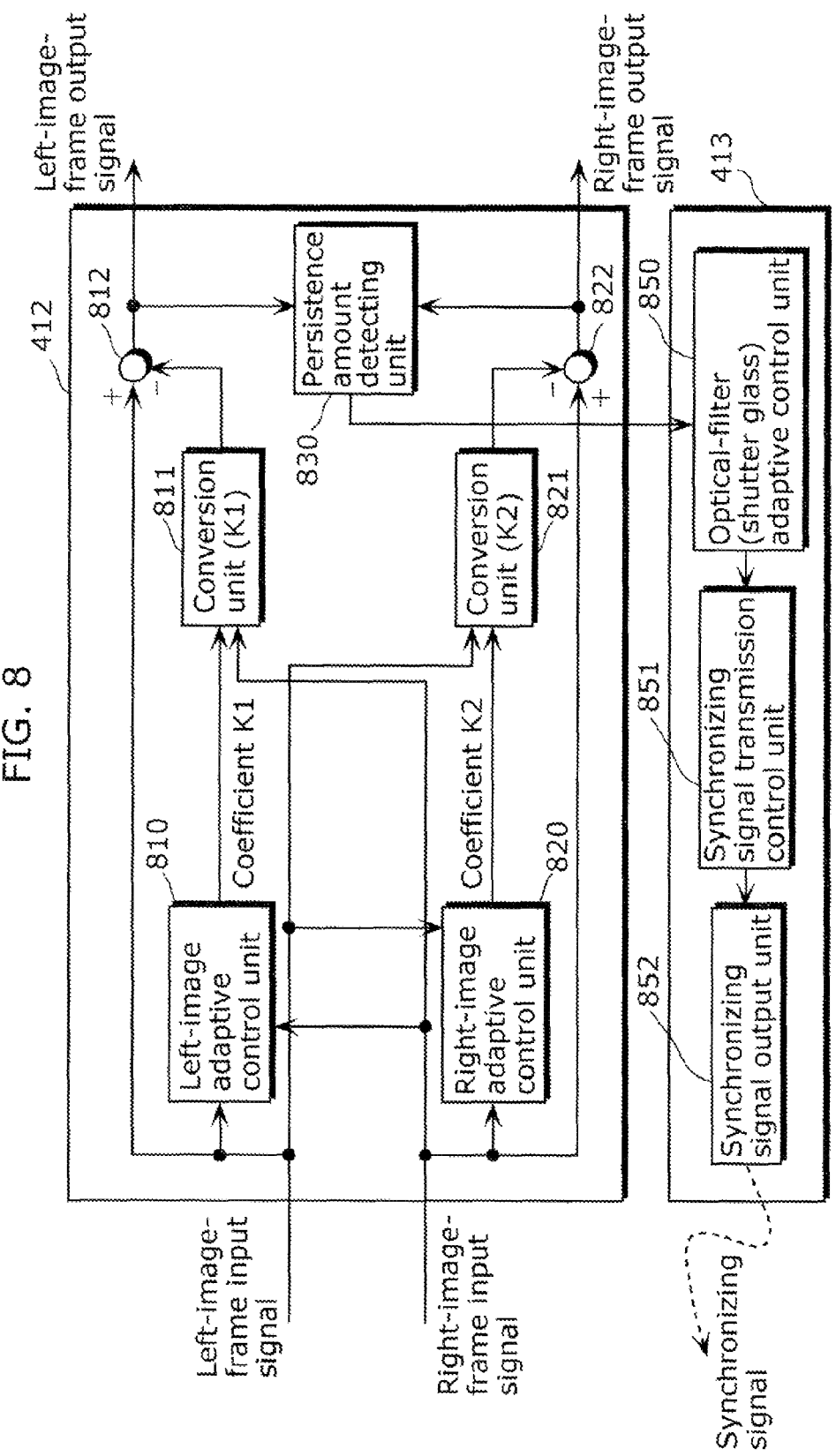
FIG. 8 shows functional configurations of a CTC unit and a synchronizing signal transmitting unit.

Functions of the CTC unit 412 shown in FIG. 4 will be outlined below with reference to FIG. 8. FIG. 8 shows configurations of internal functions of the CTC unit 412 and the synchronizing signal transmitting unit 413. The CTC unit 412 includes a left-image adaptive control unit 810, a conversion unit 811, a mixing unit 812, a right-image adaptive control unit 820, a conversion unit 821, a mixing unit 822, and a persistence amount detecting unit 830.

The left-image adaptive control unit 810 calculates and determines a coefficient K1, by which the image signal representing the right image frame is multiplied, from an input image signal representing a left image frame and an input image signal representing a right image frame corresponding to the left image frame.

In contrast with the left-image adaptive control unit 810, the right-image adaptive control unit 820 calculates and determines a coefficient K2, by which the image signal for the left image frame is multiplied, from an input image signal representing a right image frame and an input image signal representing a left image frame corresponding to the right image frame. The method of determining the coefficients K1 and K2 will be described later.

Here, a right image frame corresponding to a left image frame, or a right image frame corresponding to a left image frame means that the corresponding left and right image frames are displayed at the same time or within the same period of a predetermined length. Typically, a right (left) image frame corresponding to a left (right) image frame indicates the right (left) image frame immediately precedes the left (right) image frame in display order.

The conversion unit 811 performs a predetermined conversion of an right-image-frame input signal based on the coefficient K1 determined by the left-image adaptive control unit 810. For example, in the case where the coefficient K1 indicates the magnitude of crosstalk (persistence) in a right-image-frame input signal with respect to a left-image-frame input signal, the predetermined conversion performed by the conversion unit 811 is multiplication of the right-image-frame input signal by the coefficient K1.

The mixing unit 812 mixes the left-image-frame input signal and the right-image-frame input signal converted by the conversion unit 811. For example, in the case where crosstalk is reduced by cancellation, the mixing these signals is subtracting the right-image-frame input signal converted by the conversion unit 811 from the left-image-frame input signal.

The mixing unit 812 outputs the mixed signal as a left-image-frame output signal. The left-image-frame output signal is an image signal resulting from reduction (cancellation) of the crosstalk due to the right-image-frame input signal from the left-image-frame input signal.

Cancellation of crosstalk from a right-image-frame input signal is performed by the right-image adaptive control unit 820, the conversion unit 821, and the mixing unit 822 in the same manner (under left-right reversal) as with the left-image-frame input signal.

Figure 9:
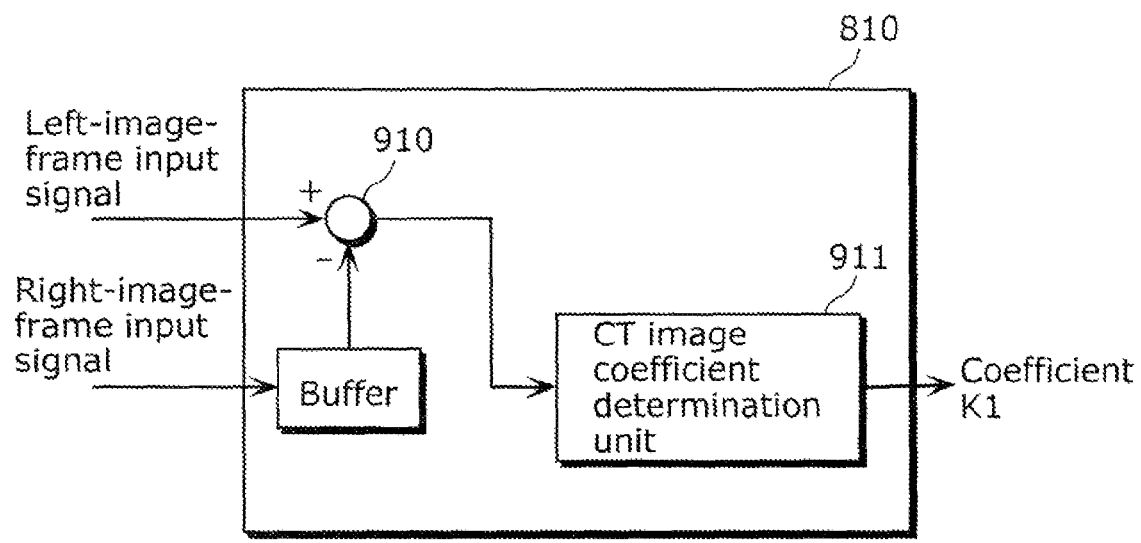
FIG. 9 shows an exemplary configuration of the left-image adaptive control unit.

FIG. 9 shows an exemplary configuration of the left-image adaptive control unit 810. The left-image adaptive control unit 810 includes a signal comparison unit 910 and a crosstalk (CT) image coefficient determination unit 911.

The signal comparison unit 910 calculates a signal level ratio between the left-image-frame input signal and the right-image-frame input signal. For example, the signal level ratio may be a differential image signal calculated by subtracting a CT image signal (right-image-frame input signal), which has an effect of crosstalk, from a crosstalked image signal (left-image-frame input signal), which is to be affected by the crosstalk. The calculated signal level ratio is provided to the CT image coefficient determination unit 911 in the following process.

Figure 10:
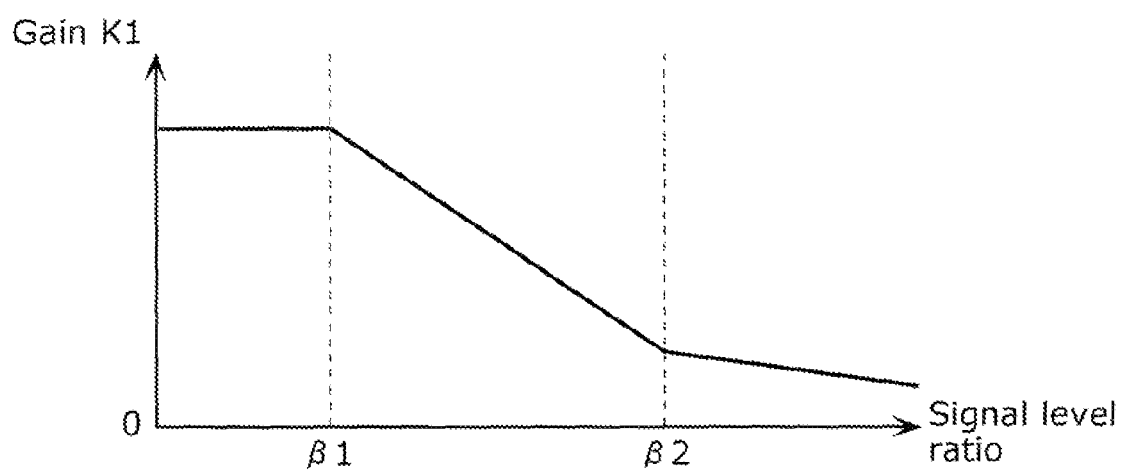
FIG. 10 shows an exemplary coefficient K1 determined by the left-image adaptive control unit K1.

The CT image coefficient determination unit 911 calculates a coefficient (gain) K1, by which the right-image-frame input signal is multiplied, based on the signal level ratio calculated by the signal comparison unit 910. FIG. 10 shows an exemplary method of determining a coefficient K1. Referring to the example shown in FIG. 10, in the range where the signal level ratio is below a threshold β1, the coefficient K1 has a constant value or a value determined by a function decreasing at a very small rate. In the range where the signal level ratio is equal to or greater than the threshold β1 and smaller than a threshold β2, the coefficient K1 decreases as the signal level ratio increases. In addition, in the range where the signal level ratio is equal to or greater than the threshold β2, the coefficient K1 decreases at a smaller rate than in the range where the signal level ratio is equal to or greater than the threshold β1 and smaller than β2. Here, the coefficient K1 is preferably equal to or smaller than 0.5 because the coefficient K1 greater than 0.5 may cause excessive signal cancellation. In addition, the coefficient K1 never excesses 1.

In the example shown in FIG. 10, when the signal level ratio is relatively small, that is, when an image frame signal having an effect of crosstalk is greater than an image frame signal to be affected by the crosstalk by a degree greater than a predetermined level (for example, the range below the threshold β1), cancellation of the crosstalk is not sufficiently effective. The coefficient K1 is therefore almost constant with little change.

Figure 11:
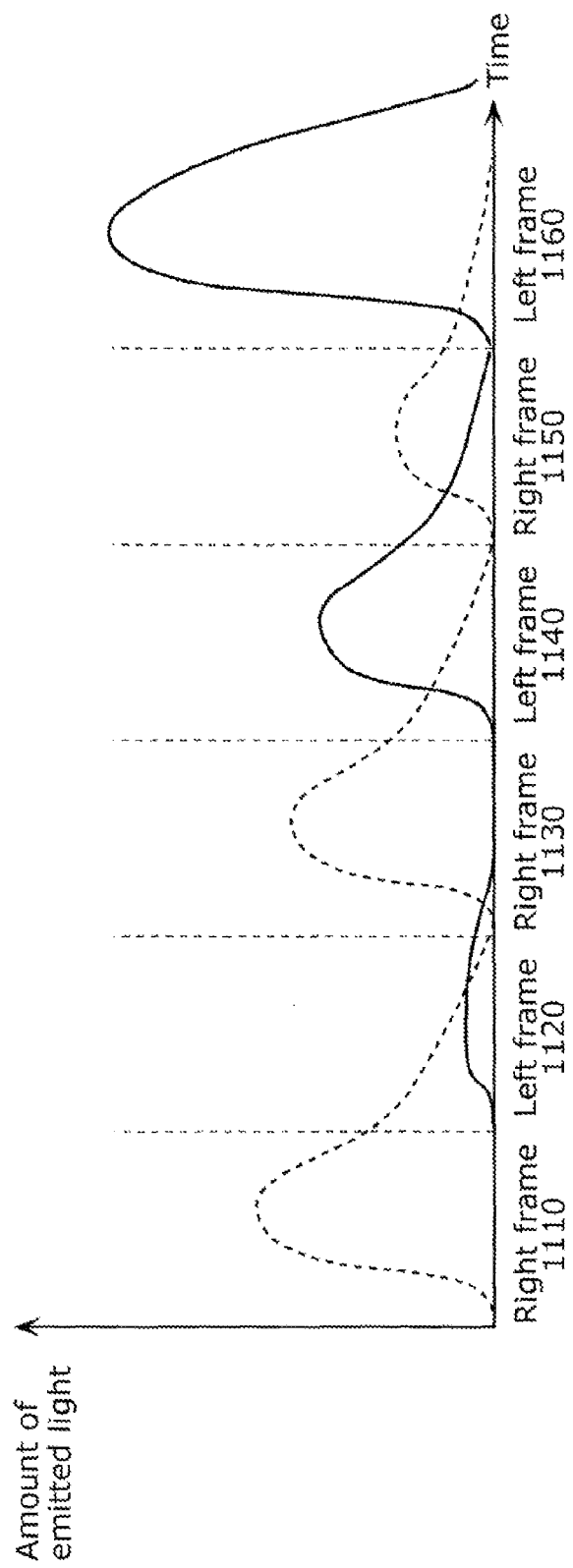
FIG. 11 shows a relationship between a right frame and a left frame.

Referring to FIG. 11, a signal representing a right frame 1110 is far greater than a signal representing a left frame 1120, so that the effect of persistence of the right frame 1110 exceeds the signal level of the left frame 1120. In this case, cancellation of crosstalk therefore cannot effectively cancel out the persistence of the right frame 1110. A large amount of cancellation of crosstalk may make the signal level of the left image frame to be displayed negative.

Next, when the signal level ratio is intermediate in the example shown in FIG. 10, that is, when the magnitude of a signal having an effect of crosstalk and the magnitude of a signal to be affected by the crosstalk is within a predetermined range (the range equal to or greater than the threshold β1 and smaller than β2), cancellation of the crosstalk is relatively effective. The value of the coefficient K1 is therefore proactively changed depending on the difference in level between the left signal and the right signal for the purpose of optimization so that the coefficient K1 is neither too large or too small.

In the example shown in FIG. 11, the relation between a right frame 1130 and a left frame 1140 is the case. In this case, since the signal representing the right frame 1130 and the signal representing the left frame 1140 are almost the same (that is, relative difference in level between the signals is within a predetermined range), cancellation of the crosstalk is likely to be effective.

When the signal level ratio is relatively large, that is, when a signal having an effect of crosstalk is smaller than a signal to be affected by the crosstalk by a degree greater than a predetermined level (the range equal to or greater than the threshold β2), the effect of the crosstalk is unlikely to be noticeable because the image frame signal to be affected by the crosstalk is relatively large. In the example shown in FIG. 11, the relation between a right frame 1150 and a left frame 1160 is the case.

The left-image adaptive control unit 810 therefore determines the coefficient K1 based on both the left-image-frame input signal and the right-image-frame input signal. It is to be noted that the method of determining the coefficient K1 shown in FIG. 10 is a mere example and Embodiment 1 is not particularly limited to this. Any method can be used instead as long as the coefficient K1 determined in the method is based on an image frame signal representing an input image.

As with the left-image adaptive control unit 810, the right-image adaptive control unit 820 determines the coefficient K2 based on an input image signal.

It is not necessary that the left-image adaptive control unit 810 and the right-image adaptive control unit 820 use the same method of determining coefficients. For example, when a left image is bright and a right image is dark during a scene, crosstalk of the left image have a large effect on the right image but the crosstalk of the right image have a small effect on the left image. Therefore, it is not necessary that the left-image adaptive control unit 810 and the right-image adaptive control unit 820 always operate in the same manner (under left-right reversal).

The conversion units 811 and 821 change signal levels of the left-image-frame input signal and the right-image-frame input signal based on the coefficients K1 and K2 determined by the left-image adaptive control unit 810 and the right-image adaptive control unit 820. The signal output by the conversion unit 811 is equivalent to the amount of light emitted in a right image frame immediately preceding a left image frame and remaining in the light emission period of the left image frame (that is, the amount of persistence of the right image frame). Similarly, the signal output by the conversion unit 821 is equivalent to the amount of light emitted in a left image frame immediately preceding a right image frame and remaining in the light emission period of the right image frame (the amount of persistence of the left image).

The mixing units 812 and 812 mixes the signals so as to reduce crosstalk based on the image signals which are at the levels changed by the conversion units 811 and 821. For example, the signals converted by the conversion unit 811 and 812 are subtracted from the respective input signals. Through this operation, the image signal to be displayed is reduced by the signal level of the crosstalk in advance. The mixing units 812 and 812 each output the signal resulting from these subtractions.

In the example described above, the coefficients K1 and K2 are dynamically (adaptively) determined based on comparison of relative signal levels of the left image frame signal and the right image frame signal. The coefficients K1 and K2 are determined based on the signal level ratio resulting from the relative comparison of the magnitudes of the input image signals representing the left image frame and the right image frame. This allows optimized crosstalk cancellation in a manner such that the coefficients K1 and K2 are minimized in the range where crosstalk originally has a small effect, the coefficients K1 and K2 are adjusted to be just enough in the range where crosstalk cancellation is necessary and very effective, and, in the range where crosstalk cancellation is not very effective, side effects of the coefficients K1 and K2 increased excessively are reduced.

Crosstalk cancellation is thus optimized for signal levels of image frames to be displayed. As a result, crosstalk cancellation performed by the crosstalk canceling unit is weakened in order to avoid side effects when crosstalk cancellation is unnecessary or unlikely to be effective, and crosstalk cancellation is reinforced or weakened in order to avoid producing an excessive or insufficient effect when crosstalk cancellation is likely to be effective, thus allowing for suitable image processing.

It is to be noted that, although the signal level ratio is calculated by subtracting an image signal having an effect of crosstalk from an image signal to be affected by the crosstalk, Embodiment 1 is not limited to this. One of other possible indices of a signal level ratio is, for example, that signal level ratio=image signal to be affected by crosstalk/image signal having an effect of crosstalk. That is, any comparison method can be used as long as the method allows for relative comparison of signal levels between an image signal to be affected by the crosstalk and an image signal having an effect of crosstalk.

<7. Detection of Amount of Persistence (Crosstalk)>

As described above, there may be a case where crosstalk of an image to be displayed is not reduced only through processing of image signals by the crosstalk canceling (CTC) unit 412. Specifically, it is the case where the signal level ratio is smaller than β1 in FIG. 10, that is, the case of the relation between the right frame 1110 and the left frame 1120 shown in FIG. 11. Here, an example will be described below according to Embodiment 1, where the viewer can have an image with reduced crosstalk even in such a case.

Crosstalk may occur in output right and left image signals even when the CTC unit 412 properly operates. Here, the persistence amount detecting unit 830 in the CTC unit 412 shown in FIG. 8 detects the amount of residual crosstalk (a persistence amount).

Figure 12:
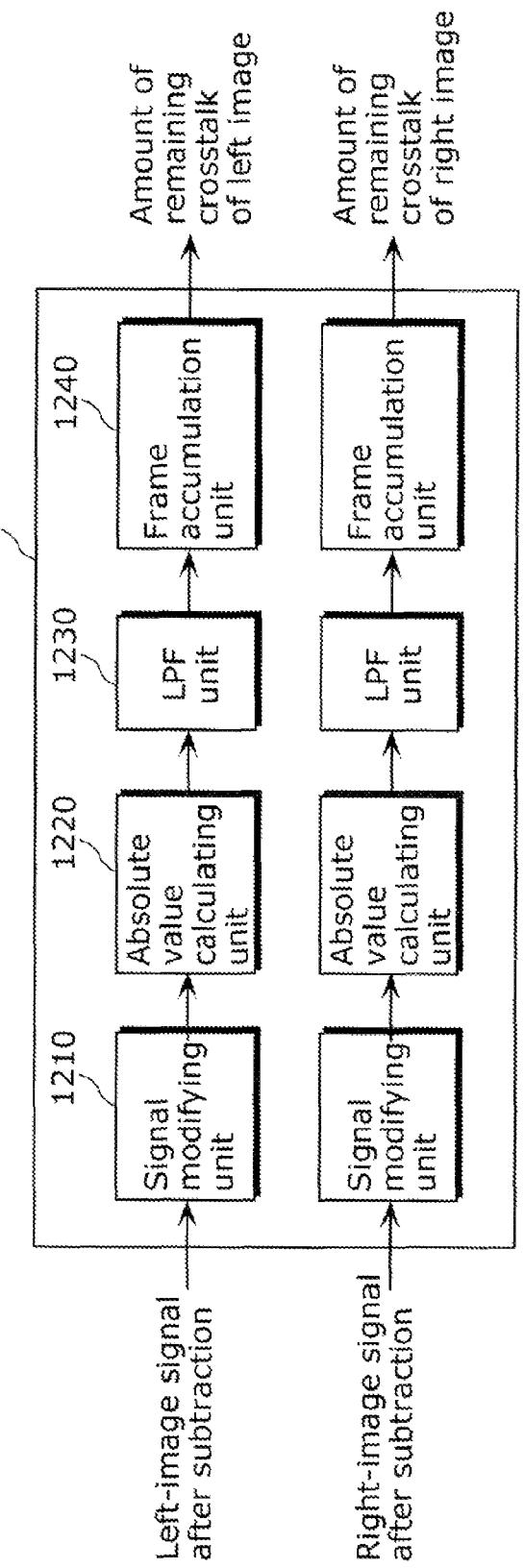
FIG. 12 shows an exemplary functional configuration of a persistence amount detecting unit according to Embodiment 1.

FIG. 12 shows an exemplary configuration of internal functions of the persistence amount detecting unit 830. Referring to the persistence amount detecting unit 830 shown in FIG. 12, the persistence amount detecting unit 830 has a configuration with which the persistence amount detecting unit 830 internally calculates a persistence amount of a left image frame and a persistence amount of a right image frame individually. Therefore, only the case of one of the image frames (the left image frame) will be described below.

The persistence amount detecting unit 830 includes a signal modifying unit 1210, an absolute value calculating unit 1220, a low-pass filter (LPF) unit 1230, and a frame accumulation unit 1240. The persistence amount detecting unit 830 detects a persistence amount of a right image frame. The persistence amount indicates an effect of the right image frame on the left image frame immediately following the right image frame in display order. More specifically, the persistence amount detecting unit 830 receives a left-image-frame output signal from the mixing unit 812 (that is, a signal with reduced crosstalk), and calculates a persistence amount by accumulating pixel values (the amount of emitted light) smaller than a predetermined threshold (zero in the example described below) among pixel values of pixels included in the left image frame.

The signal modifying unit 1210 detects the signal level of the left image frame which has been subjected to crosstalk cancellation, and modifies the signal level as necessary. Specifically, the signal modifying unit 1210 modifies signal levels of the input left image frame greater than zero, that is, all the signal levels of positive values, to be zero. On the other hand, signals having signal levels smaller than zero, that is, signal levels of negative values, are output without being modified. As a result, the signal modifying unit 1210 extracts only signals having negative values after the processing by the CTC unit 412 (that is, signals for which crosstalk has been excessively canceled).

The absolute value calculating unit 1220 calculates absolute values of the signals modified by the signal modifying unit. The absolute-value calculating unit 1220 provides an absolute value of a signal level, which is a positive value, only when an input image frame signal has a value smaller than zero.

The LPF unit 1230 decreases the rate of change in the value calculated by the absolute value calculating unit 1220. That is, the LPF unit 1230 modifies the signals subsequently output by the absolute value calculating unit 1220 so that the rate of change in the signals falls within a predetermined range.

The frame accumulation unit 1240 accumulates values output by the LPF unit, for each image frame.

Through the above processing, the amount of remaining crosstalk of each of the image frame is calculated.

Here, when the amount of the remaining crosstalk of each image frame calculated by the persistence amount detecting unit 830 is large, the image frame has a large area of pixels in a state of the left frame 1120 (in which persistence is not sufficiently reduced by crosstalk cancellation and still remains) in terms of the relation between the right frame 1110 and the left image 1120 shown in FIG. 11, or has the amount of the remaining persistence is large.

<8. Transmission of Synchronizing Signal>

As described above, there may be a case where crosstalk between right and left frames is not reduced enough only by the CTC unit 412 of the image display device 100. The image display device 100 therefore controls a synchronizing signal to be transmitted to the pair of image viewer glasses 120 based on the calculated amount of remaining crosstalk.

The amount of the remaining crosstalk of each of the right and left image frames output by the persistence amount determination unit 830 is output to the synchronizing signal transmitting unit 413.

As shown in FIG. 8, the synchronizing signal transmitting unit 413 includes an optical-filter adaptive control unit 850, a synchronizing signal transmission control unit 851, and a synchronizing signal output unit 852.

The optical-filter adaptive control unit 850 compares the persistence amount of each of the image frames output by the persistence amount detecting unit 830 with a predetermined threshold. In the case where the amount of persistence is larger than the predetermined threshold, the optical-filter adaptive control unit 850 controls timing of opening (that is, increasing the amount of light to be transmitted by) and closing (that is, decreasing the amount of light to be transmitted by) the optical filters 123 of the right and left glasses of the pair of image viewer glasses 120. This control will be described later.

The synchronizing signal transmission control unit 851 causes the synchronizing signal output unit 852, which will be described below, to transmit a synchronizing signal with the timing of transmitting a synchronizing signal determined by the optical-filter adaptive control unit 850.

The optical-filter adaptive control unit 850 and the synchronizing signal transmission control unit 851 correspond to the image signal processing IC 307 in the hardware configuration of the image display device 100 shown in FIG. 3.

The synchronizing signal output unit 852 transmits the synchronizing signal to outside (the pair of image viewer glasses 120) under the control of the synchronizing signal transmission control unit 851. The synchronizing signal output unit 852 corresponds to the infrared light emitting device 309 in the hardware configuration of the image display device 100 shown in FIG. 3.

Figure 13:
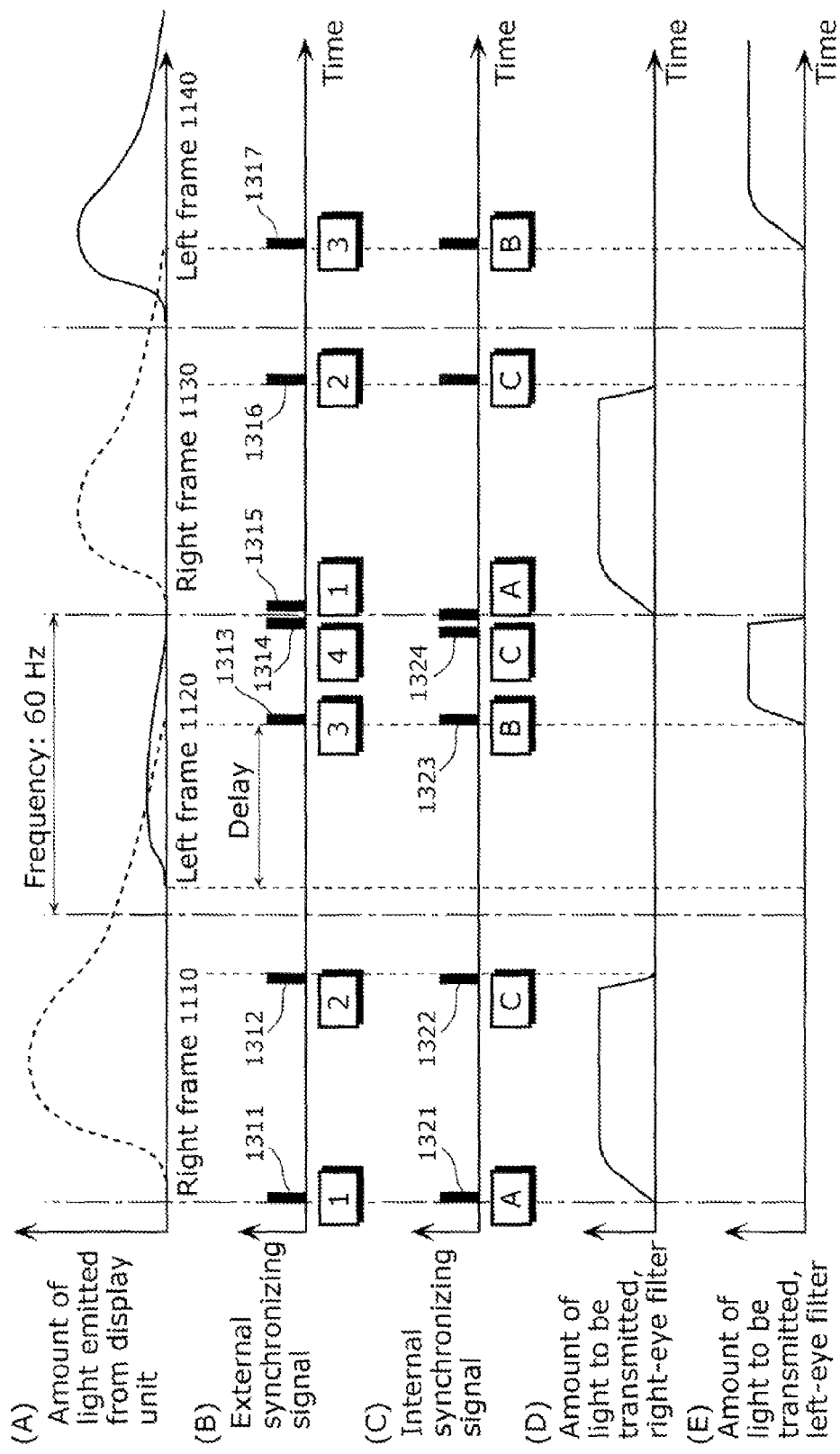
FIG. 13 shows an exemplary relationship between image frames and timing of generating synchronizing signals.

FIG. 13 shows an example in which the optical-filter adaptive control unit 850 controls transmission of a synchronizing signal according to a persistence amounts so that the timing of opening and closing the optical filters 123 of the pair of image viewer glasses 120 is controlled.

(A) of FIG. 13 shows a change in the amount of emitted light of an image to be displayed on the display unit 408 of the image display device 100. Specifically, this shows the case of the right frame 1110, the left frame 1120. the right frame 1130, and the left frame 1140 shown in FIG. 11. (B) of FIG. 13 shows the timing of generation and transmission of the synchronizing signal which the synchronizing signal transmitting unit 413 transmits when an image is displayed in the manner as shown in (A) of FIG. 13. (C) of FIG. 13 shows timing for internal synchronizing signal generated by the pair of image viewer glasses 120 in response to reception of the synchronizing signal from the image display device 100. (D) and (E) of FIG. 13 show how the pair of image viewer glasses 120 opens and closes the optical filters 123 (or adjust the amount of light to be transmitted) of the right and left glasses according to the internal synchronizing signal shown in (C) of FIG. 13.

As shown in (B), (C), and (D) of FIG. 13, when the pair of image viewer glasses 120 according to Embodiment 1 receives, through the external-synchronizing-signal receiving unit 700, a synchronizing signal (1) which indicates opening of the optical filter 121 of the right glass, a signal (A) for the operation is generated by the internal synchronizing signal generation unit 704, and the optical filter 121 of the right glass is thereby opened. When the pair of image viewer glasses 120 according to Embodiment 1 receives, through the external-synchronizing-signal receiving unit 700, a synchronizing signal (3) which indicates opening of the optical filter 122 of the left glass, a signal (B) for the operation is generated by the internal synchronizing signal generation unit 704, and the optical filter 122 for the left glass is thereby opened. Furthermore, when the pair of image viewer glasses 120 according to Embodiment 1 receives, through the external-synchronizing-signal receiving unit 700, a signal (2) which indicates closing of the optical filter 121 of the right glass or a synchronizing signal (4) which indicates closing of the optical filter 122 of the left glass, a signal (C) for the operation is generated by the internal-synchronizing-signal generation unit 704, and a corresponding one of the optical filter 121 of the right glass and the optical glass 122 of the right glass is thereby closed.

Furthermore, as shown in (B), (C), and (D) of FIG. 13, as soon as the pair of image viewer glasses 120 according to Embodiment 1 receives, through the external-synchronizing-signal receiving unit 700, the synchronizing signal (1 or 3) which indicates opening of the optical filter 121 or 122, an operation to open a corresponding one of the optical filters 121 and 121 is started. Similarly, as soon as the pair of image viewer glasses 120 according to Embodiment 1 receives, through the external synchronizing signal receiving unit 700, the synchronizing signal (2 or 4) which indicates closing of the optical filter 121 or 122, an operation to close a corresponding one of the optical filters 121 and 121 is started. That is, in Embodiment 1, it is possible to control timing of opening and closing the optical filters 121 and 122 by changing timing of transmitting synchronizing signals from the synchronizing signal transmitting unit 413.

In the case where the amount of persistence detected by the persistence amount detecting unit 830 is larger than the predetermined threshold, the optical-filter adaptive control unit 850 controls a corresponding one of the optical filters 123 of the pair of image viewer glasses 120 in order to prevent the viewer from viewing the image with crosstalk. Specifically, in the case where an image as shown in (A) of FIG. 13 (an image with a large amount of persistence) is displayed, a synchronizing signal is generated in a manner such that the optical filters 123 of the pair of image viewer glasses 120 are controlled so as to delay opening of the optical filters 123 compared to usual timing.

In the case of (B) of FIG. 13, the left frame 1120 is affected by crosstalk caused by the right frame 1120, which is displayed immediately before the left frame 1120. Because of this, although the image of the left frame 1120 is already displayed on the display unit 408 of the image display device 100, persistence (crosstalk) of the image of the right frame 1110 immediately before the left frame 1120 remains on the display unit 408. In order to reduce the effect of the persistence, it is necessary to delay starting to allow the viewer to view the left frame.

In order to achieve this, the optical-filter adaptive control unit 850 delays transmission of the third synchronizing signal 1313, which instructs the pair of image viewer glasses 120 to open (that is, to increase the amount of light to be transmitted by) the left-eye optical filter 122 in response to the left frame 1120, so that the third synchronizing signal 1313 is transmitted later than the start of displaying the left frame 1120.

As a result, under control of the left-eye optical filter 122 by the pair of image viewer glasses 120 according to the third synchronizing signal 1313, the optical filter 122 is opened later than usual. This reduces the amount of persistence of the right image frame perceived by the viewer viewing the left image frame. As a result, the viewer is allowed to view an image less affected by the persistence (crosstalk).

It is to be noted that FIG. 13 shows an example in which only one frame (the left frame 1120) is affected by persistence, for purposes of illustration. However, it is usual for actual images to include consecutive frames having the same or similar characteristics. It is therefore preferable that delay in timing of generating synchronizing signals (or delay in timing of controlling open and close of the optical filters 123 of the pair of image viewer glasses 120) be averaged among consecutive frames base on the characteristics.

That is, it is preferable that timing of generating synchronizing signal based on the image to be displayed on the display unit 408 of the image display device 100 be processed using an low-pass filter (LPF) or the like so that the timing gradually changes. This prevents sudden change in timing of generating synchronizing signals (timing of controlling open and close of the optical filters 123 of the pair of image viewer glasses 120) based on the characteristics of abrupt persistence of an image frame, allowing the viewer to view a preferable image.

Specifically, the optical-filter adaptive control unit 850 determines, based on the amount of persistence, a target length of delay in timing of opening the optical filters 123 and the number of frames to be output until the length of delay reaches the target length. It is preferable that the length of delay in opening of the optical filters 123 be gradually increased so that the length of delay reaches the target length when the determined number of the frames are output. It is preferable that the optical-filter adaptive control unit 850 increases the number of frames to be output until the length of delay reaches the target length as the target length increases.

In addition, in the case as shown in (B) of FIG. 13 where one of the optical filters 123 of the right and left glasses is open for a relatively shorter period and the other is open for a relatively longer period, the viewer perceives an image flicker (an image having unsteady brightness). As a result, the quality of the image to be viewed is degraded. The flickering occurs because the periods of time in which the optical filters are open is in proportion to the luminance of the image to be viewed. In view of this, it is preferable that the timing with which a left synchronous signals are generated and the timing with which right synchronous signals are generated (timing of controlling open and close of each of the optical filters 123 of the pair of image viewer glasses 120) have a symmetric (that is, the left and right signals indicates simultaneous operations opposite to each other), or an approximately symmetric relation.

Specifically, it is preferable that preliminary timing of generating left and right synchronous signals be individually calculated based on an image to be displayed on the display unit 408 of the image display device 100, and then definitive, timing of generating the synchronizing signals be determined so that the optical filters 123 of the left and right glasses alternately open and the periods for which the optical filters 123 are equal within a certain range.

Here, it is preferable that the preliminary timing of generating the synchronizing signal based on a darker one (an image more likely to be affected by persistence) of the left and right images be determined as the definitive time, or be reflected on the definitive times with a higher priority than the other preliminary timing. This reduces both persistence and difference in luminance between left and right images to be viewed, thus allowing the viewer to view a preferable image.

The example shown in (B) of FIG. 13 is described using, for the right frames, first synchronizing signals 1311 and 1315 each indicating a time for opening (opening time) of the right-eye optical filter 121 and second synchronizing signals 1312 and 1316 each indicating a time for closing (closing time) of the right-eye optical filter 121, and for the left frames, third synchronizing signals 1313 and 1317 each indicating a time for opening of the left-eye optical filter 122 and fourth synchronizing signals 1312 and 1316 each indicating a time for closing of the left-eye optical filter 122.

Although the timing of opening and closing the right-eye filter 121 and the left-eye filter 122 is adjusted in association with the timing of transmitting the synchronizing signals in this example, Embodiment 1 is not limited to this.

To take another example, even in the case where the first synchronizing signal and the third synchronizing signal are transmitted at the times for opening the right-eye optical filter 121 and the left-eye optical filter 122, respectively, as in the above example, information on the time for closing the right-eye and left-eye optical filters 121 and 122 may be indicated and transmitted by the first and the third synchronizing signals. The information is, for example, a period of time from open to close of each of the right- and left-eye optical filters 121 and 122. In this case, although the number of synchronizing signals transmitted from the image display device 100 to the pair of image viewer glasses 120 is reduced in comparison with the above example, it is possible to deliver the same information. This therefore increases efficiency of transmission and reception of synchronizing signals.

<9. Conclusion>

As described above, in the image display device 100 according to Embodiment 1, (1) persistence (crosstalk) of an image is reduced by crosstalk cancellation, and (2) in the case where persistence is not sufficiently reduced by the crosstalk cancellation, synchronizing signals transmitted to outside (the pair of image viewer glasses 120) is suitably controlled in order to reduce crosstalk which the viewer views in the image. To put it another way, synchronizing signals output by the image display device 100 according to Embodiment 1 to outside are suitably controlled based on a result of crosstalk cancellation.

In an image viewing system including the image display device 100 and the pair of image viewer glasses 120 according to Embodiment 1, the image display device 100 displays an image having persistence reduced by crosstalk cancellation, and furthermore, the pair of image viewer glasses 120 controls the optical filters 123 in order to reduce crosstalk of the image on the display. This produces an advantageous effect that the viewer views the image with crosstalk further reduced.

Although Embodiment 1 describes an example in which, in the case where crosstalk cancellation by the CTC unit 412 is not very effective, crosstalk is comprehensively reduced by suitably controlling synchronizing signals to be transmitted to the pair of image viewer glasses 120, Embodiment 1 is not limited to this. Synchronizing signals to be transmitted to the pair of image viewer glasses 120 may be suitably controlled in all the ranges in which the CTC unit 412 works. In this case, crosstalk is reduced more effectively. That is, any method can be used as long as the method allows for reduction of crosstalk of an image to be viewed by a viewer (or the amount of crosstalk perceived by a viewer) by crosstalk cancellation of the CTC unit 412 and control of synchronizing signals to be transmitted to outside the image display device in coordination with the crosstalk cancellation.

(Embodiment 2)

Embodiment 1 describes a case as an example in which the amount of remaining crosstalk (persistence) of an image frame is calculated from a signal output by the CTC unit 412. But methods of detecting the amount of persistence is not limited to this. Embodiment 2 will describe a method of detecting the amount of persistence different from the method described in Embodiment 1.

Figure 14:
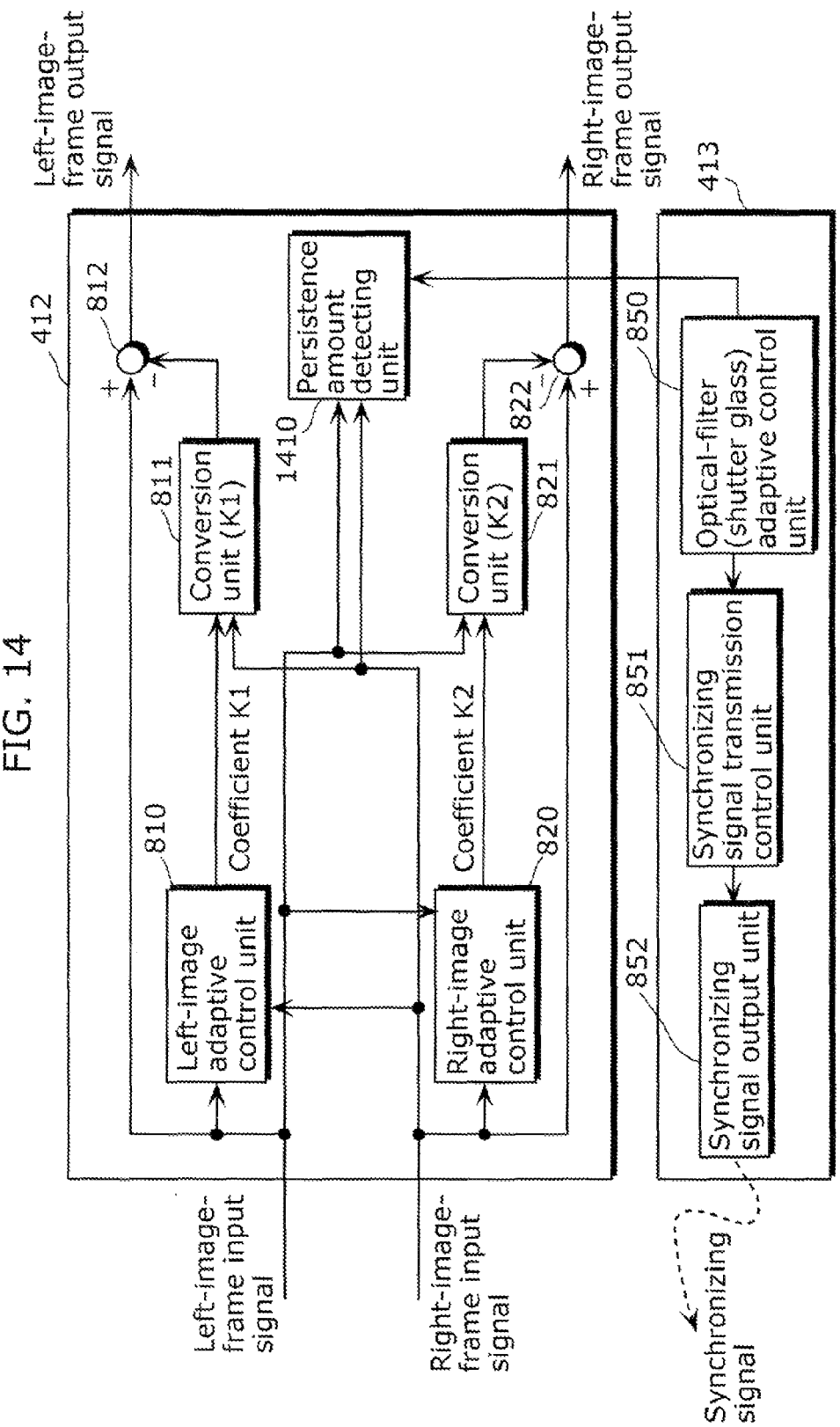
FIG. 14 shows exemplary functional configurations of a CTC unit and a synchronizing signal transmitting unit according to Embodiment 2.

FIG. 14 shows a configuration of a CTC unit 412 according to Embodiment 2. The method described in embodiment 2 is different from that of Embodiment 1 in that the persistence amount detecting unit 1410 receives a left-image-frame input signal and a right-image-frame input signal into the CTC unit 412 instead of a left-image-frame output signal and a right-image-frame input signal from the mixing units 812 and 822. Features other than this are the same as the features of Embodiment 1, and thus description thereof is omitted.

Figure 15:
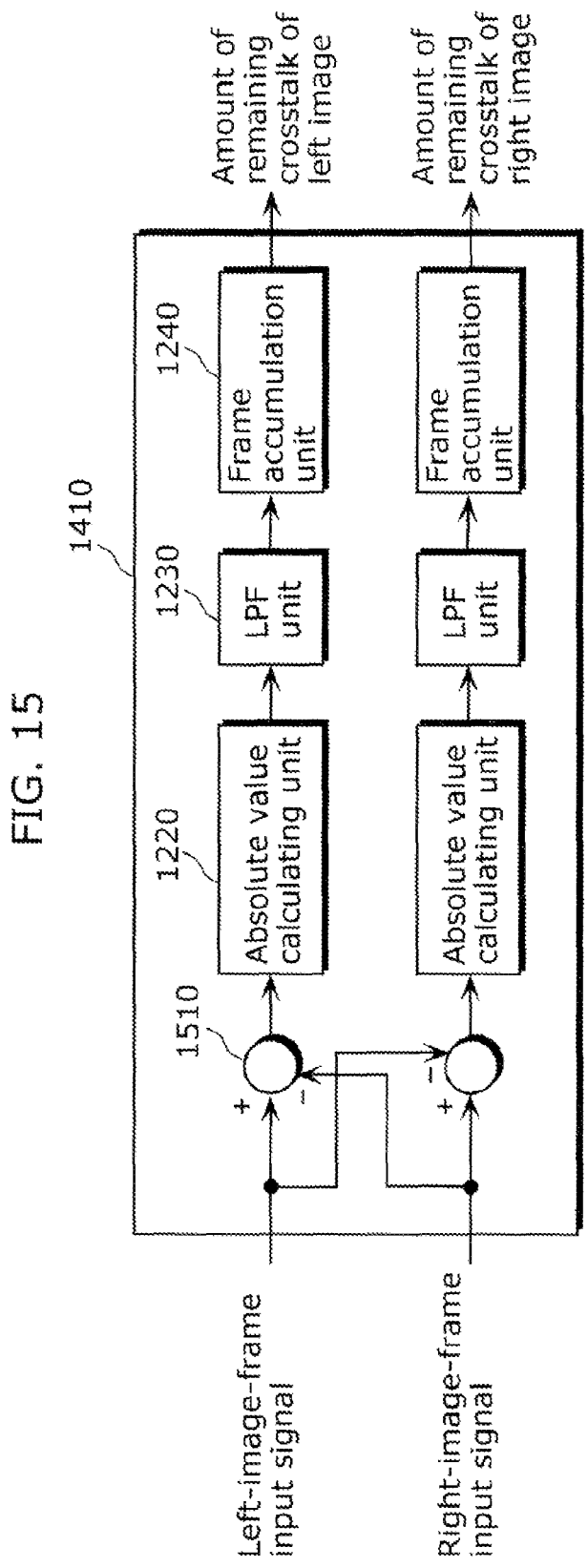
FIG. 15 shows an exemplary functional configuration of a persistence amount detecting unit according to Embodiment 2.

FIG. 15 shows a functional configuration of the persistence amount detecting unit 1410 according to Embodiment 2. The persistence amount detecting unit 1410 shown in FIG. 15 includes signal-level-ratio calculation units 1510, the absolute value calculating units 1220, LPF units 1230, and the frame accumulation units 1240. The persistence amount detecting unit 1410 is different from the persistence amount detecting unit 830 according to Embodiment 1 in that the persistence amount detecting unit 1410 includes the signal-level-ratio calculation unit 1510 instead of the signal modifying unit 1210.

The persistence amount detecting unit 1410 shown in FIG. 15 detects the amount of persistence, by calculating, on a per-frame basis, an accumulation absolute values of values calculated by subtracting pixel values of pixels represented by a right-image-frame input signal immediately before a left-image-frame input signal in displaying order from pixel values of respective pixels represented by the left-image-frame input signal.

The signal-level-ratio calculation unit 1510 calculates a signal level ratio between the left-image-frame input signal and the right-image-frame input signal. Specifically, the signal-level-ratio calculation unit 1510 calculates the signal level ratio by subtracting the right-image-frame input signal from the left-image-frame input signal.

The absolute value calculating unit 1220 calculates absolute values of all the signal level ratios between the left-image-frame input signal and the right-image-frame input signal calculated by the signal-level-ratio calculation unit 1510.

As in Embodiment 1, the LPF unit 1230 smoothes the absolute values sequentially output by the absolute value calculating unit 1220 in the order of the output, or modifies the absolute values so that the rate of change in the signals falls within a predetermined range.

The frame accumulation unit 1240 accumulates, on a per-frame basis, values calculated and output by the LPF unit for each image frame. The result of the accumulation is output as the amount of crosstalk of the left image.

The amount of crosstalk of the right image is also calculated in the same manner as the left image frame, under left and right reversal.

These calculation results are provided to the optical-filter adaptive control unit 850 of the synchronizing signal transmitting unit 413 as in Embodiment 1.

In the persistence amount detecting unit 1410, signal level ratios of the parts different between left and right image frames count toward the accumulation regardless of whether the signal level ratio is positive or negative, and the persistence amount detecting unit 1410 outputs the result of the accumulation as the amount of persistence. This is suitable for generation of a synchronizing signal allowing for difference between the overall right frame and the overall left frame in signal level (for example, parallax between the right and left frames of a 3-D stereoscopic image).

The persistence amount detecting unit 1410 according to Embodiment 2 may be implemented in another configuration.

Figure 16:
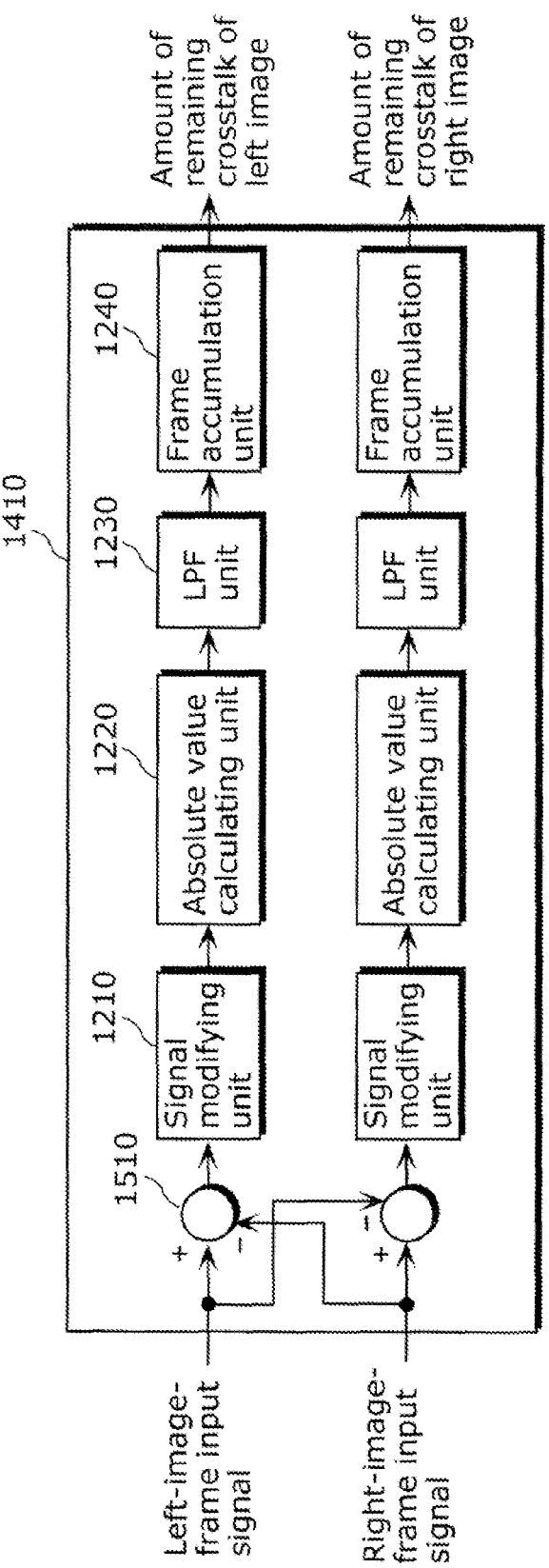
FIG. 16 shows another exemplary functional configuration of a persistence amount detecting unit according to Embodiment 2.

FIG. 16 shows another functional configuration of the persistence amount detecting unit 1410 according to Embodiment 2. The persistence amount detecting unit 1410 shown in FIG. 16 is different from the persistence amount detecting unit 830 described in Embodiment 1 in that the persistence amount detecting unit 1410 receives a left-image-frame input signal and a right-image-frame input signal, and that the signal-level-ratio calculation units 1510 shown in FIG. 15 are provided upstream of the signal modifying units 1210.

The persistence amount detecting unit 1410 shown in FIG. 16 detects the amount of persistence by calculating, on a-per frame basis, an accumulation of absolute values smaller than a predetermined threshold (zero in the example below) among values resulting from subtracting pixel values of pixels represented by a right-image-frame input signal immediately preceding a left-mage-frame input signal in displaying order from pixel values of respective pixels represented by the left-image-frame input signal.

All the positive values among the values calculated by the signal-level-ratio calculation unit 1510 are modified to zero by the signal modifying unit 1210.

The absolute value calculating unit 1220 calculates absolute values of the negative values among the values output by the signal modifying unit 1210. The LPF unit 1230 smooths the absolute values. The frame accumulation unit 1240 accumulates the resultant values on a per-frame basis. The result of the accumulation is output by the persistence amount detecting unit 1410.

In this case, only signal level ratios calculated for an area in which a right-image-frame input signal is larger than a left-image-frame input signal are accumulated on a per-frame basis and indicated as the amount of persistence. This is suitable for controlling generation of synchronizing signals allowing for the amount of crosstalk of an overall image frame regardless of whether or not crosstalk cancellation is effective.

As described above, the persistence amount detecting units 830 and 1410 may have optional functional configurations as shown in Embodiment 1 and Embodiment 2 designed for different purposes. That is, the persistence amount detecting units 830 and 1410 may use any method as long as the method allows for calculation of the amount of persistence for each image frame based on either an image signal after crosstalk cancellation or an image signal before crosstalk cancellation.

Detection of the amount of persistence for each image frame by the persistence amount detecting units 830 or 1410 allows generation of synchronizing signals for appropriate control of the optical filter unit 706 of the pair of image viewer glasses 120.

(Embodiment 3)

Embodiment 3 will specifically describe control by the optical-filter adaptive control unit 850 described in Embodiments 1 and 2.

Figure 17:
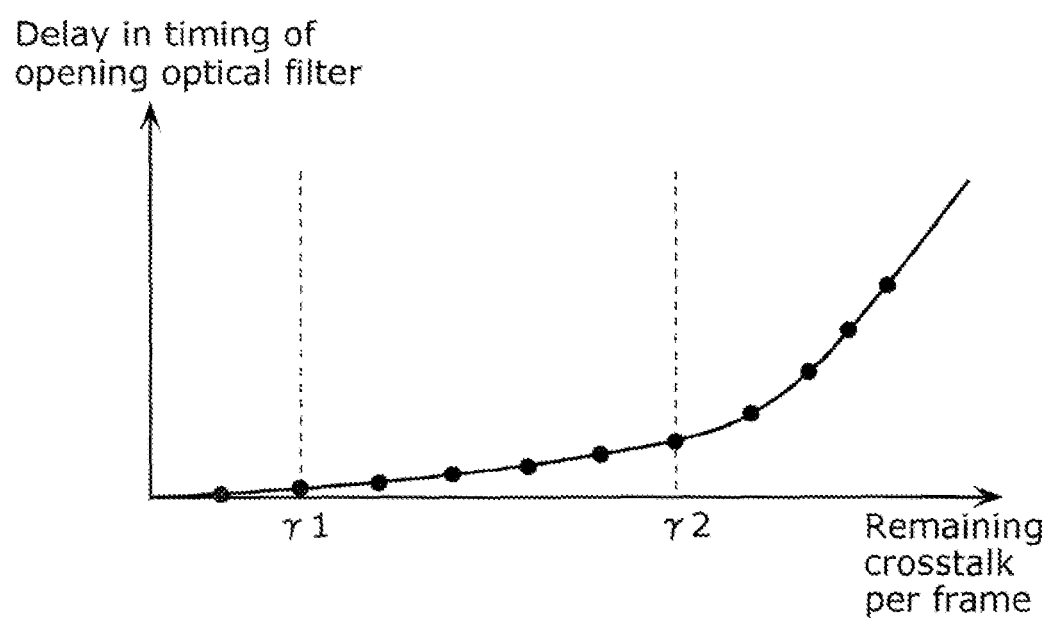
FIG. 17 shows a relationship between the amount of persistence and the length of delay in timing of opening an optical filter.

FIG. 17 is a graph showing an exemplary control by the optical-filter adaptive control unit 17. The horizontal axis indicates the accumulative amount of persistence per frame calculated by the persistence amount detecting units 830 and 1410 described in Embodiments 1 and 2, respectively. The vertical axis indicates the length of delay in timing of opening the optical filter 121 or 122 of the pair of image viewer glasses 120 based on the accumulative amount of persistence.

Referring to FIG. 17, it is obvious that the optical-filter adaptive control unit 850 makes the length of delay in the timing of opening of the optical filter 121 or 122 with respect to the timing of outputting the frame longer for a larger amount of persistence which is detected by the persistence amount detecting unit 830 or 140.

More specifically, in the case where the amount of persistence of a frame is relatively small (smaller than a threshold γ1), the optical-filter adaptive control unit 850 produces no delay or, if any, a small delay in the timing. In the case where the amount of persistence of a frame is within a predetermined range (equal to the threshold γ1 or greater and below a threshold γ2), the optical-filter adaptive control unit 850 moderately increases the length of delay with increase in the amount of the persistence. In the case where the amount of persistence of a frame is relatively large (greater than γ2 in the case shown in FIG. 17), the optical-filter adaptive control unit 850 increases the length of delay with increase in the amount of persistence greatly for the increase in the amount of persistence.

Typically, the adaptive control unit 850 makes the length of delay in a synchronizing signal to be output synchronously with the right-image frame (that is, the timing of opening the right-eye optical filter 121) longer for a larger persistence amount between a left-image frame and a right-image frame immediately following the left-image frame. Similarly, the optical-filter adaptive control unit 850 makes the length of delay in a synchronizing signal to be output synchronously with the left-image frame (that is, the timing of opening the left-eye optical filter 122) longer for a larger amount of persistence between a right-image frame and a left-image frame immediately following the right-image frame.

The timing of opening the optical filter 121 or 122 is thus delayed according to the value of the amount of persistence, so that the viewer wearing the pair of image viewer glasses 120 can view an image with less persistence.

It is to be noted that control by the optical-filter adaptive control unit 850 is not restricted by the relation shown in FIG. 12. The optical-filter adaptive control unit 850 may use any method as long as times for opening the optical filters 121 and 122 determined in the method are based on the amount of persistence of a frame calculated by the persistence amount detecting unit 830 or 1410.

In addition, although the optical-filter adaptive control unit 850 described with reference to FIG. 17 determines times for opening the optical filters 121 and 122, the optical-filter adaptive control unit 850 may determine times for closing the optical filters 121 and 122. That is, any method may be used in the optical-filter adaptive control unit 850 as long as the method allows the optical-filter adaptive control unit 850 to control times for opening or closing the optical filters 121 and 122 of the pair of image viewer glasses 120 in coordination with the process of crosstalk cancellation.

The optical-filter adaptive control unit 850 may hold information on the amount of persistence and timing of opening and closing optical filters as shown in FIG. 17 as a function which represents the graph shown in FIG. 17 or as a table which represents the relation between the amount of persistence and the length of delay for some points on the graph and calculates values between the points by linear interpolation.

In addition, as described in Embodiments 1 and 2, the calculation method to be used by the optical-filter adaptive control unit 850 may depend on the method used in the persistence amount detecting unit 830 or 1410.

As described above, timing of opening and closing the optical filters 121 and 122 are suitably determined from the amount of remaining crosstalk of an image frame, so that the viewer wearing the pair of image viewer glasses 120 can view a preferable image.

(Embodiment 4)

Figure 18:
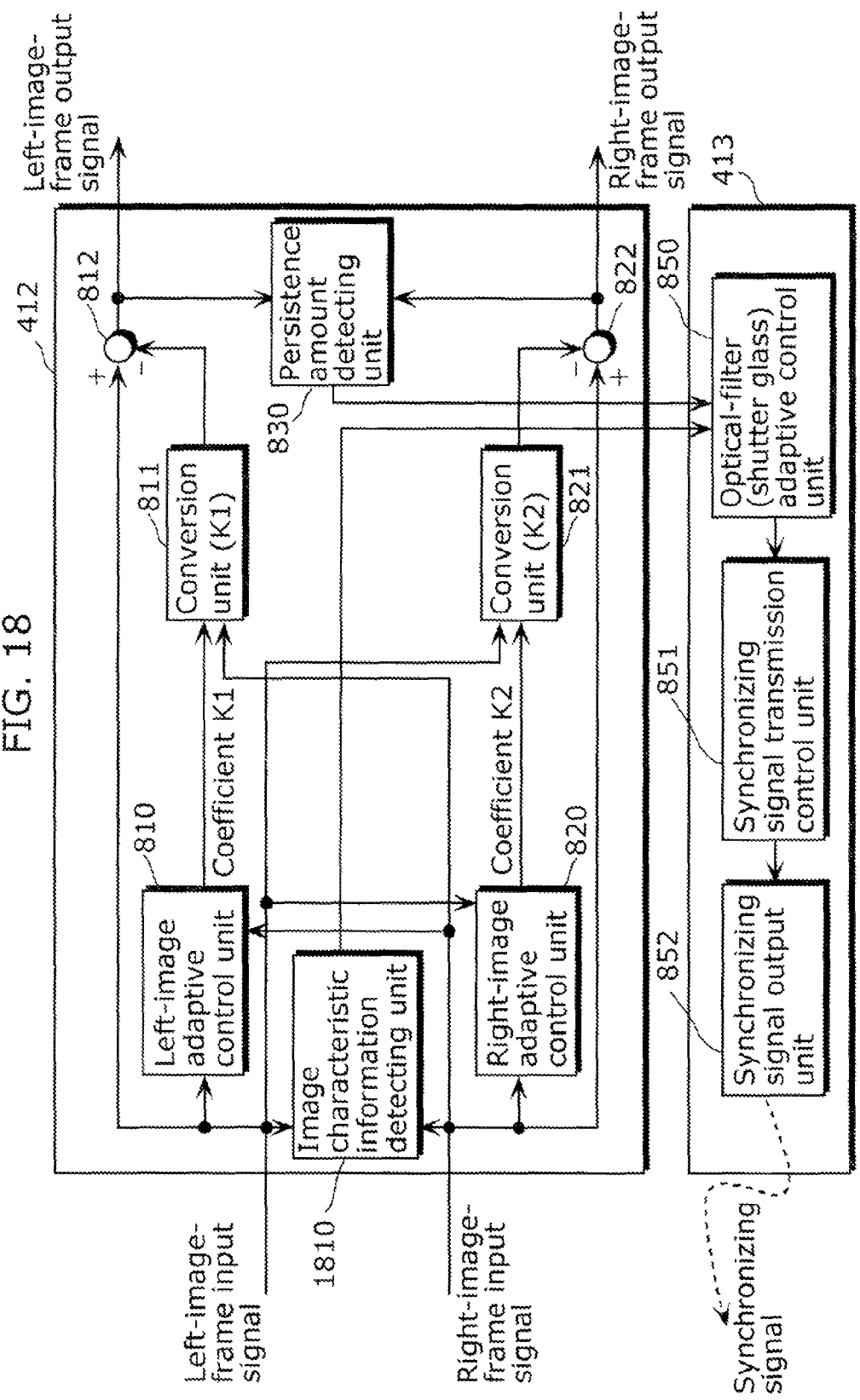
FIG. 18 shows exemplary functional configurations of a CTC unit and a synchronizing signal transmitting unit according to Embodiment 4.

Embodiment 4 will describe a configuration in which the CTC unit 412 shown in Embodiment 1 is further provided with the image characteristics information detecting unit 1810. FIG. 18 shows the CTC unit 412 and the synchronizing signal transmitting unit 413 to be described in Embodiment 4.

The CTC unit 412 according to Embodiment 4 further includes the image characteristics information detecting unit 1810 which detects image characteristics information from right- and left-image-frame input signals. The image characteristics information detected by the image characteristics information detecting unit 1810 is, for example, information on scenes included in an image, changes between scenes, average picture levels (APL) of image frames, motion vectors, color gamuts represented by input signals, and so on. The image characteristics information detecting unit 1810 detects such image characteristics information for each frame included in an image or each scene including consecutive frames.

The synchronizing signal transmitting unit 413 generates a suitable synchronizing signal based on image characteristics information, which is detected and output by the image characteristics information detecting unit 1810, and the amount of persistence of an image detected by the persistence amount detecting unit 830, and then outputs the generated synchronizing signal.

Figure 19:
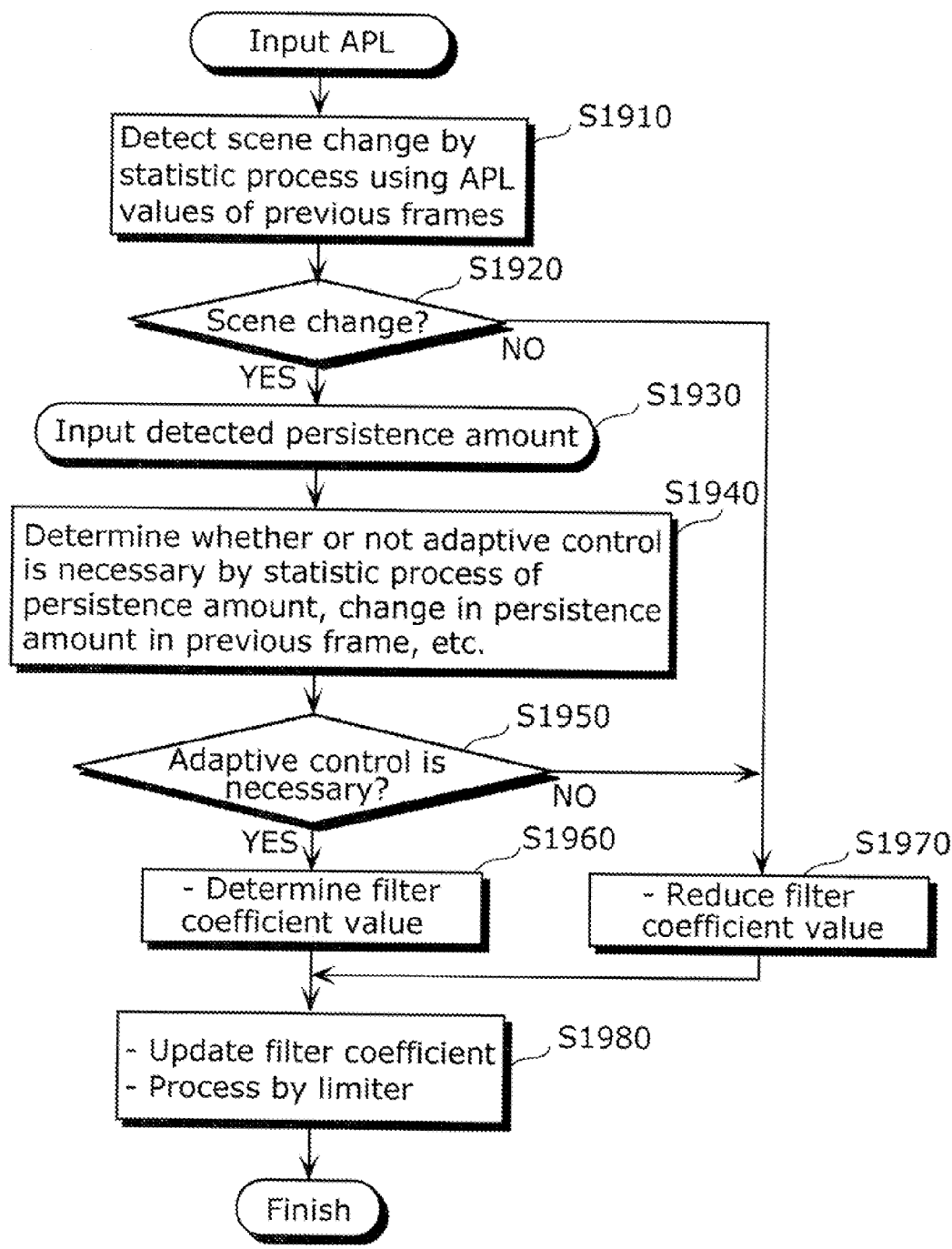
FIG. 19 is a flowchart showing an operation of determining a coefficient for an LPF which controls the amount of control by the optical-filter adaptive control unit when a scene change is detected according to Embodiment 4.

FIG. 19 is a flowchart showing an exemplary operation for detecting a scene change in adaptive control by the optical-filter adaptive control unit 850 of the synchronizing signal transmitting unit 413 according to Embodiment 4.

When receiving image characteristics information (here, an APL is used as an example) from the image characteristics information detecting unit 1810, the optical-filter adaptive control unit 850 detects a scene change in an image using information including history information on APLs previously input (Step S1910). A scene change in an image is calculated through a statistical process which produces an result, for example, that the amount of a change within a unit time or a unit frame of an APL is greater or smaller than a predetermined value, or that a change rate of an APL is out of a predetermined range.

Subsequent processes are different between in the case where there is a scene change and in the case where there is no scene change (Step S1920).

In the case where there is a scene change (YES in Step S1920), the optical-filter adaptive control unit 850 obtains the amount of persistence from the persistence amount detecting unit 830 (Step S1930). In this case, there is a possibility of a large change in the relation (the amount of residual crosstalk) between the right-image frame and the left-image frame. Accordingly, the optical-filter adaptive control unit 850 changes the length of delay in timing of opening the optical filters 121 and 122.

Next, the optical-filter adaptive control unit 850 determines timing of generating a synchronizing signal based on the value of the obtained amount of persistence and the value of the amount of persistence previously input. That is, the optical-filter adaptive control unit 850 determines whether or not the optical-filter adaptive control unit 850 adaptively (dynamically) controls timing of controlling open and close of the optical filters 123 of the pair of image viewer glasses 120. This determination is made in the following way: For example, in the case where the obtained amount of persistence causes persistence greater than a predetermined range, or in the case where change in the amount of persistence in the past (preferably, the amount of persistence between frames immediately preceding the current frame), there may be a large change in effect of crosstalk of an image to be displayed on the display unit 408 of the image display device 100. In this case, it is necessary to adaptively control timing of generating a synchronizing signal in response to the change.

Subsequent processes are different between in the case where the adaptive control is necessary and in the case the adaptive control is not necessary (Step S1950).

In the case where a determination is made that the adaptive control is necessary (YES in Step S1950), the optical-filter adaptive control unit 850 determines a length of delay in the timing of generating a synchronizing signal (and a period of time for light transmission) and a coefficient to be used in an LPF process to be performed on the length of delay and the period of time for light transmission (Step S1960). Then, the optical-filter adaptive control unit 850 gradually increases the length of delay for each output of a frame so that the actual length of delay reaches the determined length of delay (target length of delay) when a predetermined number of frames are output.

The LPF coefficient can be determined to account for the amount of change in the length of delay (and the time of light transmission) between a frame before the scene change and a frame after the scene change so that the change in the length of delay (or the time of light transmission) causes no unusual feeling of the viewer at the scene change without compromising responsiveness. For example, the length of delay for the current frame is determined by adding an infinite impulse response low-pass filter (IIRLPF) to the value (the target length of delay) obtained by performing a predetermined calculation on the detected value of the amount of persistence. In the case where a scene change is detected, the LPF coefficient is set to a larger value for a larger amount of change between scenes to allow for responsiveness, depending on the amount of change between the scenes. This allows the control to be responsive to changes between the scenes and reflects the degree of the changes. Alternatively, the LPF coefficient may be determined so that the number of frames to be output until the length of delay reaches the target length of delay is larger for a longer target length of delay.

On the other hand, in the case where no scene change is detected in Step S1920 (NO in Step 1920), or in the case where a determination is made in Step S1950 that adaptive controlling is not necessary (NO in Step S1950), the optical-filter adaptive control unit 850 determines a smaller value as the LPF coefficient to reduce the effect of the LPF (Step S1970). In this case, the optical-filter adaptive control unit 850 determines that there is no change in the relation between the right-image frame and the left-image frame (the amount of crosstalk), and therefore sets the filter coefficient to a predetermined value of reduction so that the actual length of delay naturally reaches the target length of delay.

The optical-filter adaptive control unit 850 updates the value for the LPF processing with the LPF coefficient determined in Step S1960 or S1970 (Step S1980). In the case where the new LPF coefficient value is out of a predetermined range, it is forcibly replaced with a value within the predetermined range. This prevents the LPF unit from using an unexpectedly great or small LPF coefficient which causes excessive effectiveness of the LPF operation or substantial ineffectiveness thereof.

As described above, in the case where there is a large change in the amount of persistence at a scene change, the optical-filter adaptive control unit 850 prevents abrupt change in the image which a viewer views based on the scene detection using APL as image characteristics and the detected amount of persistence. In the case where there is a relatively small change or no change in the amount of persistence at a scene change, the optical-filter adaptive control unit 850 reduces change in timing of generating synchronizing signals (the timing of opening and closing the optical filter 123 of the pair of image viewer glasses 120) so that change in luminance due to unnecessary control is minimized. The viewer is thus allowed to view a preferable image.

Although APLs are used as image characteristics information in the above description, Embodiment 4 is not limited to this. Image characteristics information other than APLs, such as the magnitude of a motion vector between frames or the change rate of color distribution may be used for detection of a scene change. In addition, the image characteristics information need not relate to detection of scene changes, and information regarding other than this may be used instead.

Although the image characteristics information detecting unit 1810 according to Embodiment 4 detects the image characteristics information based on the left-image-frame input signal and the right-image-frame input signal, Embodiment 4 is not limited to this. For example, the image characteristics information detecting unit 1810 may detect image characteristics information based on only one of the left-image-frame input signal and the right-image-frame input signal. This is because the image characteristics information detecting unit can detect image characteristics information from only one of the right image and the left images which are often substantially identical. In this case, the image characteristics information detecting unit 180 has a simpler configuration.

In addition, in the case where optimum adaptive control for a left image and that for a right image are different, the optical-filter adaptive control unit 850 according to Embodiment 4 may perform the adaptive control as shown in Embodiment 1 based on a later time for generation of a synchronous signal or on a shorter open period for which either of the right optical filter 121 and the left optical filter 122 of the pair of image viewer glasses 120 is open.

The following will describe another method of determining the length of delay in the timing of opening the optical filters 121 and 122. The optical-filter adaptive control unit 850 receives image characteristics information detected by the image characteristics information detecting unit 1810 and the amount of persistence detected by the persistence amount detecting unit 830. The optical-filter adaptive control unit 850 may perform adaptive control based on different relations between the amount of persistence and times for opening and closing the optical filters 121 and 122 as shown in FIG. 20A and FIG. 20B, switching the relations depending on the image characteristics information.

Figure 20A:
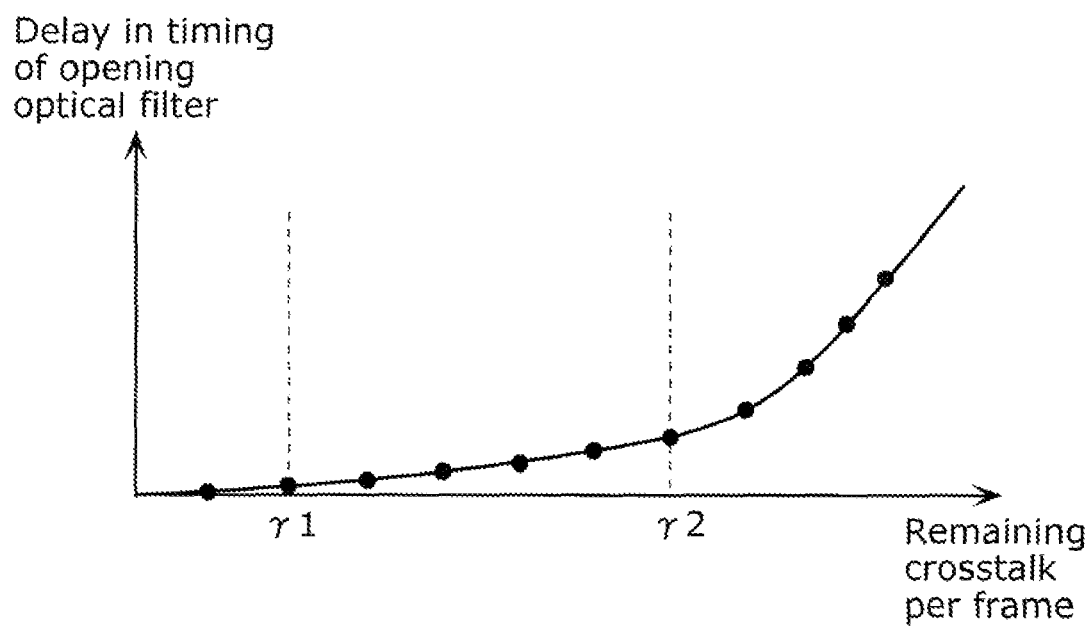
FIG. 20A shows an exemplary relationship between the amount of persistence and the length of delay in timing of opening an optical filter according to Embodiment 4.
Figure 20B:
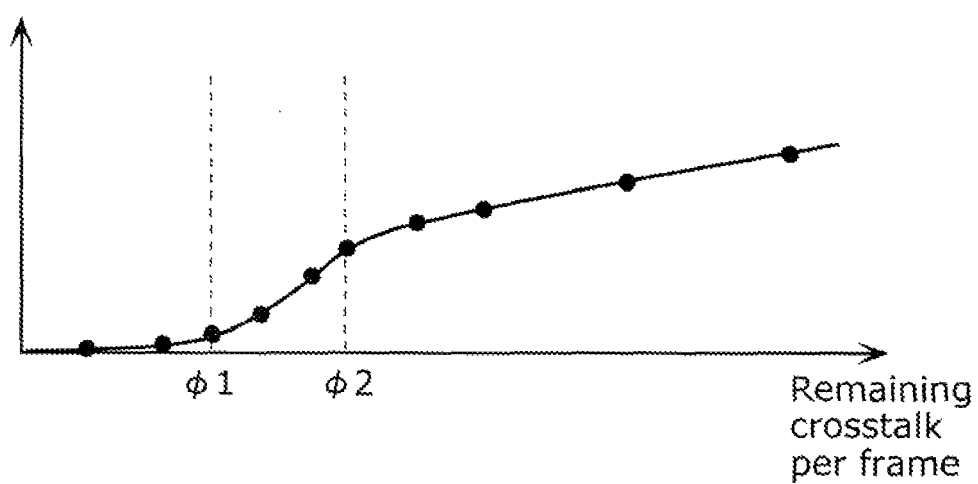
FIG. 20B shows another exemplary relationship between the amount of persistence and the length of delay in timing of opening the optical filter according to Embodiment 4.

For example, in the case of a relatively dark scene, the optical-filter adaptive control unit 850 determines times for opening and closing the optical filters 121 and 122 based on a relation as shown in FIG. 20A. On the other hand, in the case of a relatively light scene, the optical-filter adaptive control unit 850 determines times for opening and closing the optical filters 121 and 122 based on a relation as shown in FIG. 20B.

FIG. 20A shows an example in which the length of delay in timing of opening the optical filters 121 and 122 greatly increases in the case where the amount of persistence of a frame is equal to or greater than a predetermined value ($\gamma 2$). On the other hand, FIG. 20B shows an example in which the length of delay greatly increases in a range where the amount of persistence is relatively small (below $\phi 2$), and at an almost constant rate in the range where the amount of persistence is equal to $\phi 2$ or greater.

A scene showing a relatively dark image is greatly affected by crosstalk (persistence). However, the relation having the characteristics as shown in FIG. 20A is used in order to avoid showing an image which is excessively dark because of a large length of delay in timing of opening the optical filters 121 and 122. On the other hand, a scene showing a relatively light image is not affected very much by reduction of a light transmission rate by increasing the delay of times for opening the optical filters 121 and 122. Therefore, in order to make crosstalk reduction more effective, the amount of control (the length of delay) of the optical filters 121 and 122 is increased even for a relatively small amount of persistence as shown in FIG. 20B.

It is to be noted that control by the optical-filter adaptive control unit 850 is not restricted by the relations shown in FIG. 20A or FIG. 20B. The optical-filter adaptive control unit 850 may perform any control as long as it suitably changes times for opening and closing the optical filters 121 and 122 based on the amount of persistence (crosstalk) transmitted from the CTC unit 412 and the image characteristics information detected by the image characteristics information detecting unit 1810 in order to increase and decrease the amount of light to be transmitted by the optical filters 123 of the pair of image viewer glasses 120 (that is, to decrease and increase the length of delay in timing of opening the optical filters 121 and 122).

In addition, the image information detected by the image characteristics information detecting unit 1810 is not limited to the information on brightness of each scene described in Embodiment 4. Any information can be used as long as it is information which is indicated by an input image and relates to an image to be displayed, such as a scene change, an APL level of an image frame, a motion vector, a color gamut of an input signal, RGB color distribution, or contrast.

In the configuration shown in Embodiment 4, the image characteristics information detecting unit 1810, the CTC unit 412, and the optical-filter adaptive control unit 850 work in a coordinated way so that persistence (crosstalk) is more effectively reduced in the image viewed by the viewer.

(Variations of Embodiments 1 to 4)

In the cases described in above Embodiments 1 to 4, the left-image adaptive control unit 810 and the right-image adaptive control unit 820 of the CTC unit 412 each calculate only one coefficient. Specifically, the left-image adaptive control unit 810 calculates the coefficient K1, and the right-image adaptive control unit 820 calculates the coefficient K2. However, the configuration of the CTC unit 412 is not limited to this. For example, a CTC unit 2000 shown in FIG. 21 may be used instead.

Figure 21:
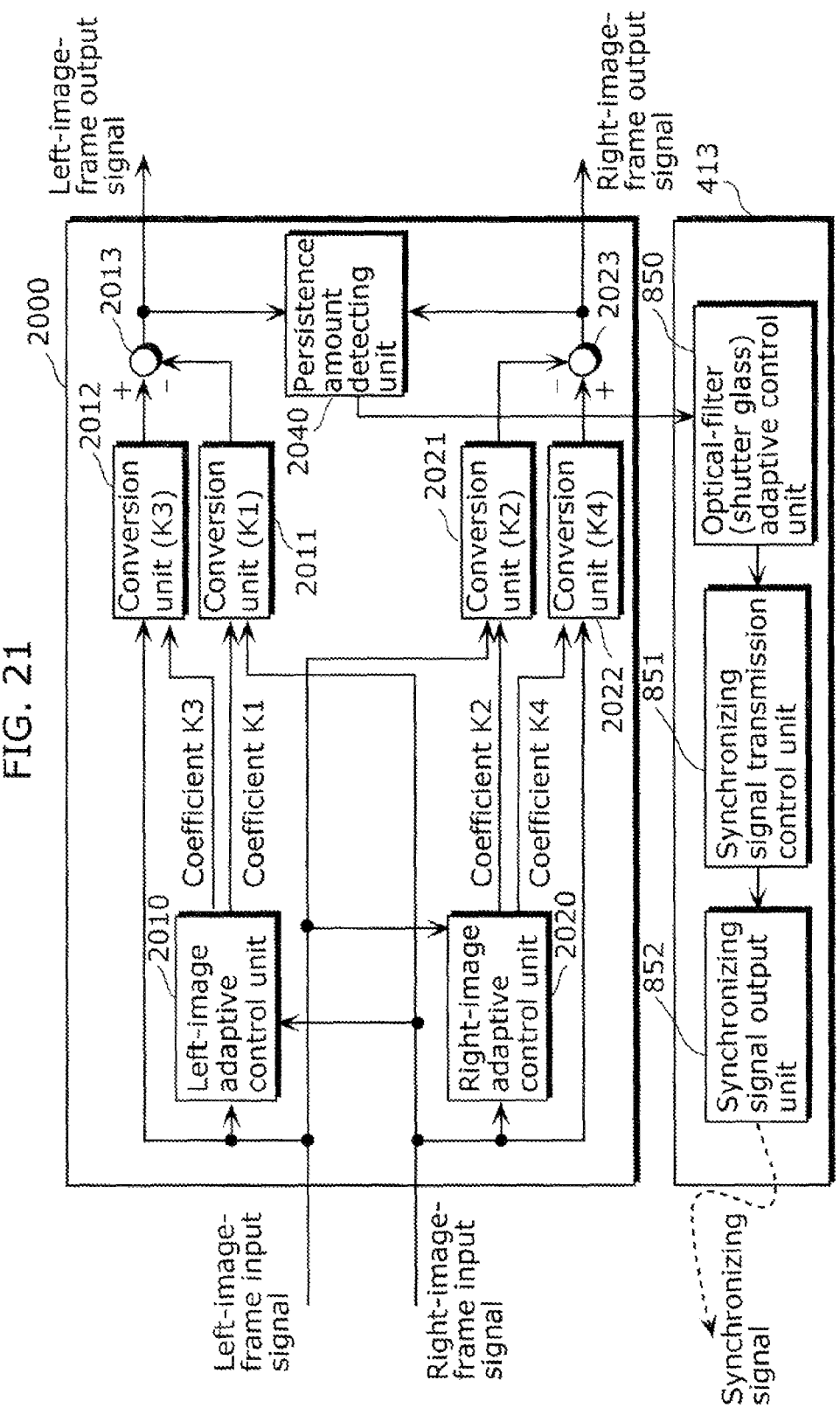
FIG. 21 shows exemplary functional configurations of a CTC unit and a synchronizing signal transmitting unit according to a variation of the above embodiments.

The CTC unit 2000 shown in FIG. 21 includes a left-image adaptive control unit 2010 which calculates coefficients K2 and K4 to be used for conversion of a right-image-frame input signal, and a right-image adaptive control unit 2020 which calculates coefficients K1 and K3 to be used for conversion of an left-image-frame input signal. A conversion unit 2012 receives an left-image-frame input signal and converts it using the coefficient K3. A conversion unit 2022 receives an right-image-frame input signal and converts it using the coefficient K4. Mixing units 2013 and 2023 mix the converted left and right image frame signals to cancel persistence.

In comparison with the CTC unit 412, the CTC unit 2000 additionally uses, for example, the coefficient K3 with a left-image-frame input signal in a process of generating a left-image-frame output signal. This prevents the cancellation using a right-image-frame input signal converted by the conversion unit 2011 from becoming excessive. For a right-image-frame output signal, using the coefficient K4 produces the same effect. With this, the CTC unit 2000 reduces persistence more suitably than the CTC unit 412.

It should be understood that the CTC unit 2000 is applicable not only to Embodiment 1 but also to Embodiments 2 to 4.

Figure 22:
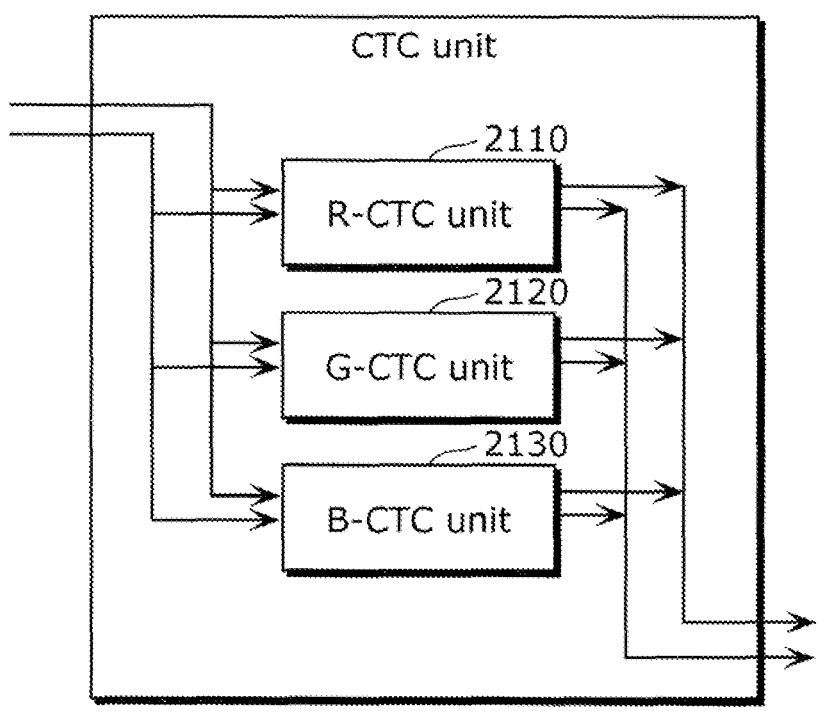
FIG. 22 shows a configuration in which a CTC unit is provided for each of R, G, and B signals.

In addition, in the case where the input signals for the right and left image frames described in Embodiments 1 to 4 are each composed of RGB signals, the CTC unit may have an internal configuration for crosstalk cancellation performed on each of the RGB signals, as shown in FIG. 22. When the RGB signals are individually controlled in the CTC unit as shown in FIG. 22, crosstalk is cancelled in a more suitable manner depending on characteristics of each of the signals. In the example shown in FIG. 22, the CTC unit includes an R-CTC unit 2110, a G-CTC unit 2120, and a B-CTC unit which cancel crosstalk of an R signal, a G signal, and a B signal, respectively, for right image frames and left image frames.

In the case where RGB signals are used, characteristics of crosstalk (persistence) vary by color. Therefore, the coefficients K1, K2, K3, and K4 may be determined using different methods, and determined values thereof may be different among these colors. In addition, the optical-filter adaptive control unit 850 may generate synchronizing signals for controlling timing of increasing and decreasing the amount of light to be transmitted by the optical filters 121 and 122, depending on the amounts of crosstalk different among these colors Particularly in the case where the display unit 408 of the image display device 100 is a PDP, the amount of persistence of green (G) is usually the largest, red (R) the second largest, and blue (B) the smallest. The coefficients for crosstalk cancellation are therefore determined in a manner such that effects on signals increase in order of the G signal, the R signal, and the red signal. The optical-filter adaptive control unit 850 may generate synchronizing signals using green (G), for which the amount of persistence tends to be the largest, as a standard. As described above using this example, the image characteristics information detecting unit, the CTC unit, and the optical-filter adaptive control unit may control crosstalk cancellation in different manners depending on characteristics of each color. This also allows the viewer to view a preferable image.

Although RGB in additive color mixture is used as an example in the above description, the present invention is not limited to this. For example, the present invention may be used with cyan, magenta, and yellow in subtractive color mixture.

(Embodiment 5)

Embodiment 5 will describe a case where an image display device which displays an image using a subfield drive, such as a plasma display. The following will describe display characteristics of the image display device, synchronizing signals generated depending on the display characteristics, and operation of the pair of image viewer glasses 120 according to the synchronizing signals.

Figure 23:
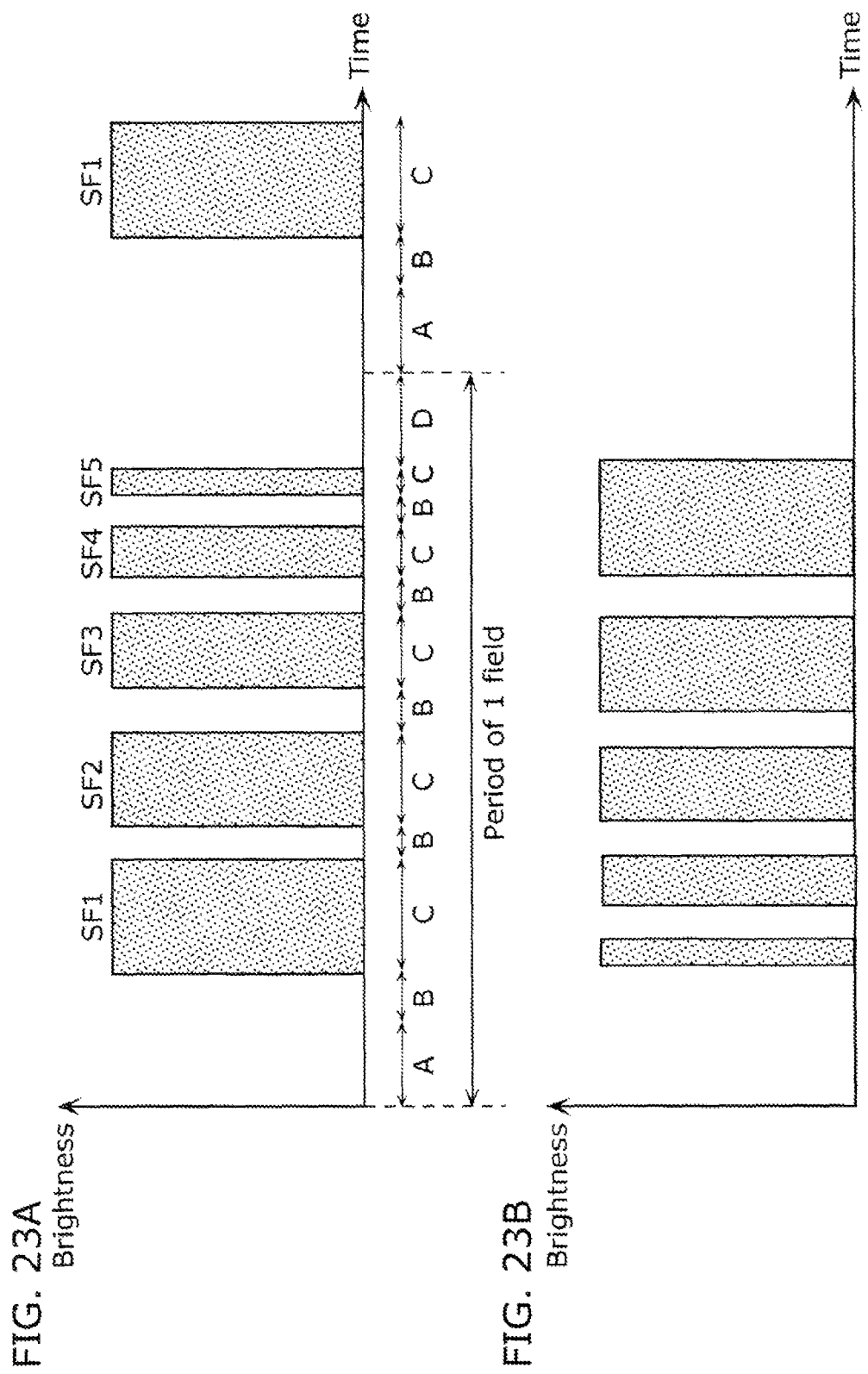
FIG. 23A shows an exemplary arrangement of subfields having different weights in the case of subfield drive.
FIG. 23B shows another exemplary arrangement of subfields having different weights in the case of subfield drive.

In the image display device 100 displaying an image using a subfield drive as in plasma displays, light emission of each pixel of the image display device 100 is controlled in a manner as shown in FIG. 23A. Specifically, a frame (field), which is a unit display period of each image, is divided into subfields each having a different light emission period. Gradation control of the frame is performed by controlling light emission and non-light emission of the subfields which are used in different combinations.

More specifically, whether or not light is emitted is determined for each of the subfields depending on a pixel value of the pixel. In this method, light is emitted for a longer total time of subfields to provide a brighter frame (field), and for a shorter total time of subfields to provide a darker frame (field). Light emission and non-light emission of the subfields may be controlled by, for example, the image signal processing IC (image signal processing unit) 307 or the display panel (display unit) 308 shown in FIG. 3.

In addition, each subfield is weighted according to its brightness (that is, light emission period). Subfields 1 to 5 (SF1 to SF5) have different weights (different brightness levels). In this case, the SF1, which has the longest light emission period, is the brightest subfield in perceptual terms, and the closer to the SF5 having the shortest light emission period, the darker the subfield is in perceptual terms.

The SF1 to SF5 are arranged in a predetermined sequence. For example, in the case where light is emitted in order from the SF1 to the SF5, the subfields are arranged in descending order. The lower the place of the subfield is (the right-hand of the graph shown in FIG. 23A), the darker the subfield is.

On the other hand, in the example shown in FIG. 23B, a subfield in a lower place is brighter. In this example, the subfields are arranged in ascending order. Furthermore, an image in which gradation is achieved by causing each pixel to emit light during one of the subfields having different weights (brightness levels) or plural ones in combination. For example, in the case shown in FIG. 23A, light is emitted from a pixel during none of the SF1 to the SF5 in the darkest field. The pixel is caused to emit light during the SF5 in the second darkest, the SF4 in the third darkest field, and the SF5 and SF4 in the fourth darkest field. Different levels of brightness are thus achieved.

That is, the brighter the image is, the greater the total weight of the subfields during which light is emitted is. The darker the image is, the smaller the total weight of the subfields during which light is emitted is. In order to display an image having the highest level of brightness, light is emitted during all the subfields. In order to display an image having the lowest level of brightness, light is emitted during none of the subfields.

In the case where a stereoscopic image is displayed on a plasma display by alternately displaying left and the right images different from each other by parallax, it is preferable that subfields be arranged in descending order rather than in ascending order because of the effect of persistence between the left and right images. Because phosphors take a certain time to emit or decay light, the amount of persistence remaining in the next image frame is likely to be large in the case where light is emitted during a subfield having a greater weight in a lower place of the sequence.

On the other hand, there is a problem particular to a method of light emission of subfields. In the case where a plasma display displays an image for one field, four different operations are generally necessary for the subfields included in the field in order to cause phosphors to emit light. The four different operations are each performed in four different periods shown in FIG. 23A. The four periods are as follows: (A) an initialization period which is prior to all the subfields; (B) a write period and (C) a sustainment period each iterated for each of the subfields; and (D) an erase period in which phosphors are caused to decay light after the sustainment period of the last subfield.

In order to cause a pixel to emit light during each of the subfields, phosphors of the pixel are caused to emit light by the operations through the above periods. However, phosphors may fail to emit light for a reason, for example, that charge accumulated in the electrode of the pixel is insufficient or that accumulated charge has been decayed for any reason. In this case, the pixel fails to emit light during the subfield, and the image relatively darkens only in the field, affecting the quality of the image to be viewed. Particularly in the case where a method is employed in which a pixel is caused to emit light during subfields arranged in descending order, degradation in image quality may be larger when the pixel fails in light emission of the subfield at the top of the sequence (the brightest subfield). Therefore, such failure in light emission affects more severely in the case where the subfields are arranged in descending order than in ascending order.

When any of the above-described methods is used with an image display device which displays a stereoscopic image by subfield drive, there is a conflict between the measures against persistence in a stereoscopic image and the measures for improvement in reliability of subfield drive. Embodiment 5 will describe an image display device which employs subfield drive and a pair of image viewer glasses, which allow a viewer to view a preferable stereoscopic image with reduced effect of persistence.

Figure 24:
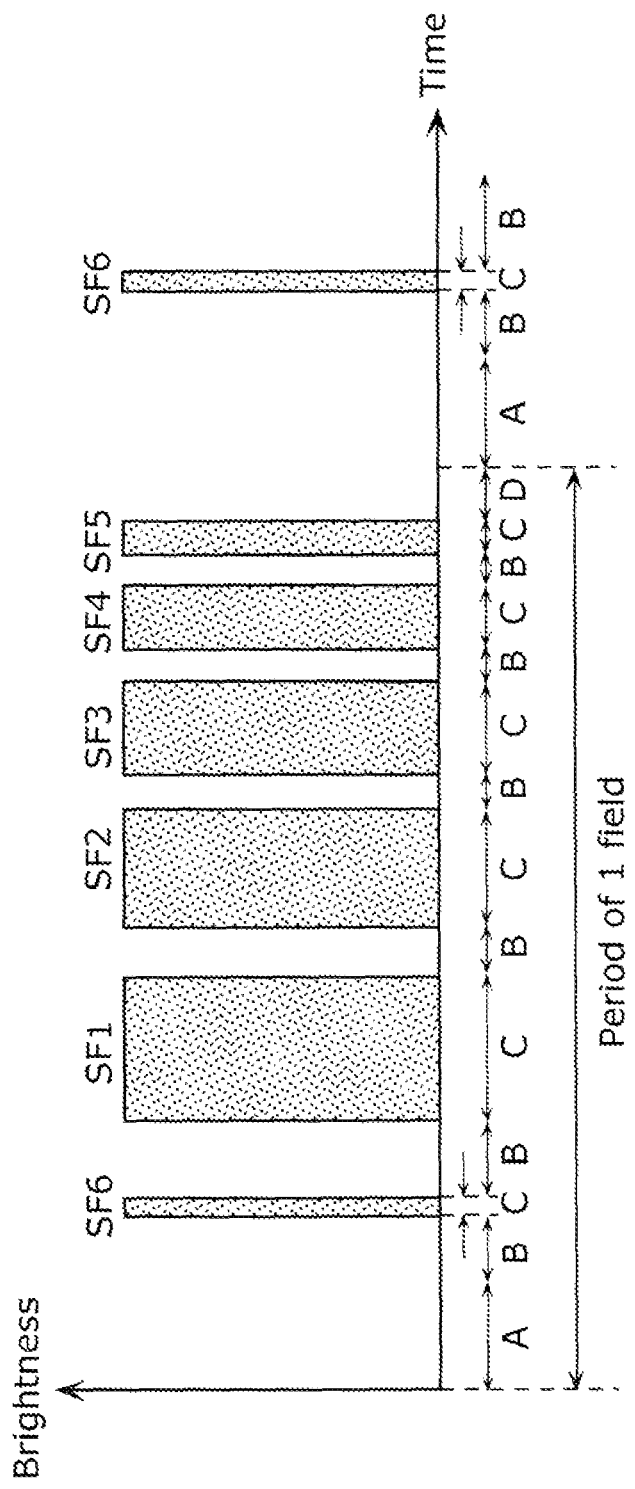
FIG. 24 shows subfield drive in the case where a presubfield is provided preceding subfields.

FIG. 24 shows an exemplary method of subfield light emission used by the image display device 100 according to Embodiment 5. Referring to FIG. 24, an SF6 is provided at the top of the sequence of subfields. The SF1 to SF5 are arranged in descending order, where weights (brightness) of them decreases in order. However, the SF6, during which light is emitted prior to the SF1, has a smaller weight than any of the SF1 to SF5 (that is, the SF6 has the shortest light emission period).

In this case, in order to cause light emission of the subfields, initialization is performed in an initialization period (A), which is followed by a write period (B) and a sustainment period (C) of the SF6. This is further followed by the write period (B) and sustainment period (C) of the SF1. In the case where light is emitted also during the SF2 or later, the write period (B) and sustainment period (C) of the respective subfields follow the above periods. The sustainment period (C) of the last subfield is followed by an erase period (D) to end the light emission in the field. This is the end of control of light emission of the subfields included in one field.

This operation provides light emission of the SF6, that is, the write period (B) and the sustainment period (C), prior to the SF1. In the case where light is not properly emitted during the SF6, specifically, where charge is not sufficiently accumulated in electrodes of phosphors or has decayed after being accumulated, re-charging the electrode in the write period (B) of the SF1 increases reliability of light emission of the subfields of at least the SF1 or later.

Although the SF6 is added to the SF1 to SF5 in the example shown in FIG. 24, Embodiment 5 is not limited to this. For example, it is also possible that the SF5 is placed at the top of the SF1 to the SF5, with the SF1 to the SF4 arranged in descending order. In this case, the number of subfields remains the same as in the conventional practice. In addition, the SF during which light is emitted prior to the SF1 needs not be the one having the least weight. However, a subfield with less weight is preferable in view of a large effect on brightness caused by failure in light emission of an SF having a greater weight and placed at the top of the sequence.

In addition, the subfields from the second in the sequence (the SF1 to the SF5) are arranged in descending order in the example shown in FIG. 24, Embodiment 5 is not limited to this. For example, it is also possible that, in the sequence of the SF1 to the SF5, one of the subfields SF1 and SF2, which has relatively greater weight, is arranged in the second place (immediately after the SF6) and the other in the third place, and the rest are arranged in any order.

Figure 25:
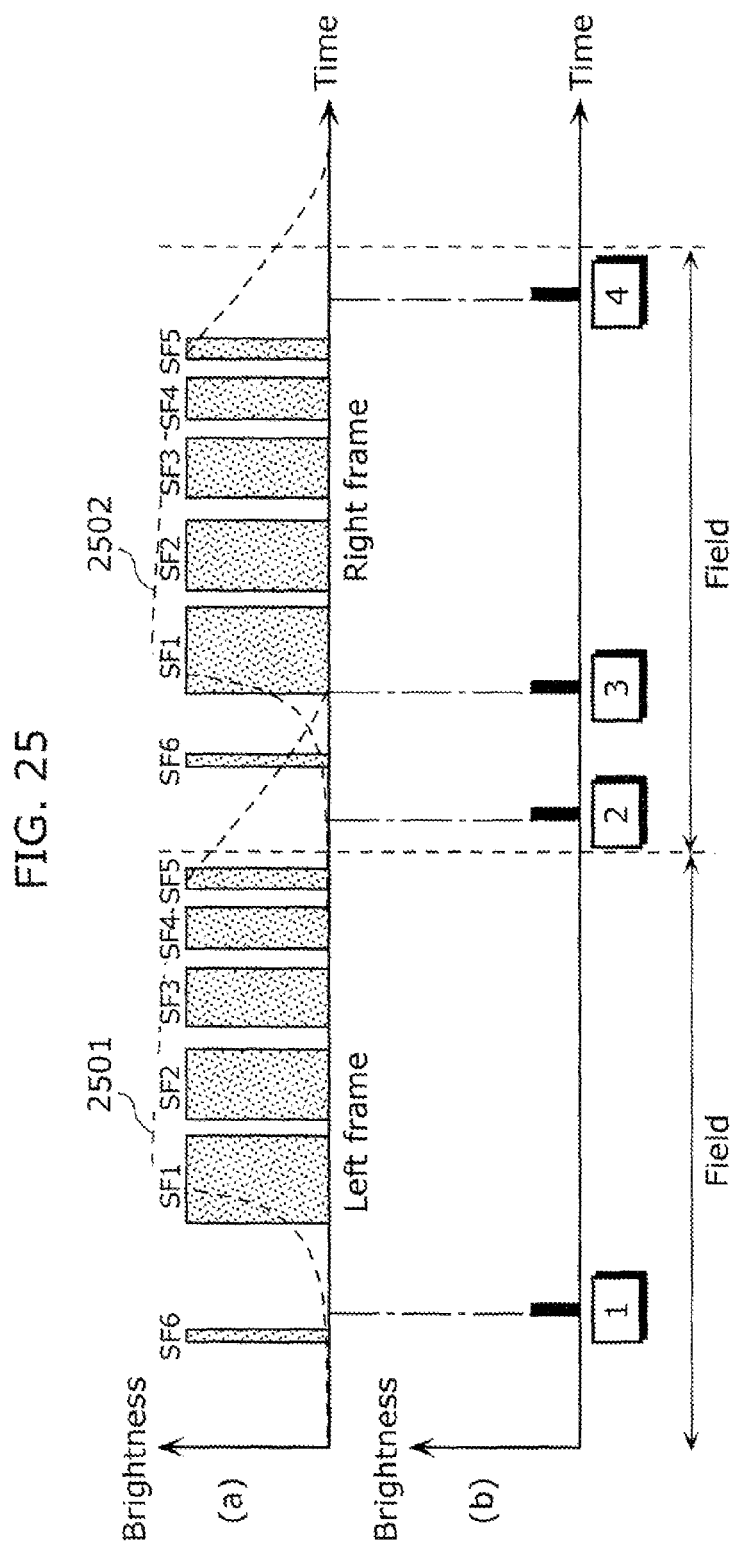
FIG. 25 shows a relationship between subfield drive and timing of outputting synchronizing signals.

FIG. 25 shows light emission in the case where light emission of subfields is performed for stereoscopic image display in the manner as shown in FIG. 24. (a) of FIG. 25 shows a situation where a pixel is caused to emit light during the subfields and the light emission causes the display surface to emit light. (b) of FIG. 25 shows synchronizing signals generated by the image display device 100 in the situation shown in the (a) of FIG. 25.

For the subfields in the left frame shown in (a) of FIG. 25, light emission of the subfield SF6 precedes light emission of the SF1 to the SF5. This light emission of the SF6 is performed prior to light emission of the consecutive subfields of the SF1 to the SF5 in order to increase the reliability of the light emission of the SF1 to the SF5. After the light emission of the SF6, light is emitted during the SF1 to the SF5. The graph line 2501 indicates brightness of the light emitted from the display surface due to actual luminescence of phosphors caused by the control of light emission of the SF1 to the SF5.

As indicated by the graph curve 2501, the light emission slightly lags the control of light emission of the subfields. This is due to delay in response of the phosphors. Even after the erase period (D) which follows the sustainment period of the SF5 of the left frame, the light emitted from the display surface does not completely decay within the display time of the left frame and may remain as persistence in the display time of the right frame which follows the display time of the left frame.

In Embodiment 5, since the SF1 to the SF5 are arranged in descending order, effect of the persistence is relatively smaller than in the case where the SF1 to the SF5 are arranged in ascending order. However, adding the SF6 to the existing SF1 to SF5 increases the total time of the subfields during which the light is emitted per field, so that the amount of emitted light increases and the persistence has large effect in comparison with the conventional practice. In the case where the SF1 to the SF5 are arranged in ascending order, the persistence has larger effect than in the case of descending order as in the conventional practice.

In order to avoid such effects, the optical filters 123 of the pair of image viewer glasses 120 according to Embodiment 5 is properly controlled so that the viewer can have a preferable image with reduced effect of persistence. When the image display device 100 controls light emission of subfields as shown in (a) of FIG. 25, the synchronizing signal transmitting unit 413 generates and outputs a synchronizing signal (1) for opening (that is, for increasing the amount of light to be transmitted by) the left-eye optical filter 122 of the pair of image viewer glasses 120 after the end of the light emission of the SF6 (hereafter referred to as a pre-subfield) prior to the subfields (the SF1 to the SF5) or after the end of the write period.

This operation is effective because the pre-subfield is not intended for contributing to brightness of an image to be displayed but for increasing reliability of light emission of the subfields following the pre-subfield, and an image represented by light emission of the pre-subfield need not be shown to the viewer. The synchronizing signal transmitting unit 413 therefore generates and outputs a synchronizing signal for opening the left-eye optical filter 122 after or at the start of light emission of the pre-subfield. In this case, it is preferable that the image signal processing IC 307 cause light emission of the pre-subfield in each of the fields.

In addition, in the case where the light emission of the SF6 and the SF1 to SF5 of the left frame causes the display surface to to emit light in the manner as indicated by the graph line 2501, the synchronizing signal transmitting unit 413 generates and outputs a synchronizing signal (2) for closing (that is, for decreasing the amount of light to be transmitted by) the left-eye optical filter 122 of the pair of image viewer glasses 120 when brightness of the left frame goes below a predetermined threshold. (a) of FIG. 25 shows an example in which the synchronizing signal (2) is generated and output in the display time of the right frame which follows the display time of the left frame. This operation is effective because the left-eye optical filter 122 opening for a longer period of time allows the viewer to perceive a greater amount of light and therefore view the image as a brighter one.

However, in the case where the generation and output of the synchronizing signal (2) is excessively delayed, light emission of the subfield in the following right frame affects left frame image which is still viewed. It is therefore preferable that the synchronizing signal (2) be generated and output before the start of light emission in the following frame at the latest. In the case shown in (a) of FIG. 25, it is preferable that the synchronizing signal (2) be generated and output before or at the start of the light emission of the SF6 in the right frame (or the rising of the graph curve 2502).

In the following right frame, the synchronizing signal transmitting unit 413 generates and outputs a synchronizing signal (3) for opening (that is, for increasing the amount of light to be transmitted by) the right-eye optical filter 121 when the amount of persistence of the preceding left frame is less than a predetermined amount and the amount of light emitted in the right frame is equal to or greater than a predetermined amount. The persistence varies by the conditions as described above, such as whether the subfields are arranged in ascending order or in descending order, or whether a subfield having greater weight is placed before the others or after the others in the sequence of the subfields. Therefore, the synchronizing signal transmitting unit 413 may dynamically change a synchronizing signal to generate and transmit depending on the sequence of light emission of the subfields or characteristics thereof. This allows for generation and transmission of synchronizing signals suitable for an image, so that the viewer can view a preferable image.

The synchronizing signal transmitting unit 413 generates and outputs a synchronizing signal (4) for closing (that is, for decreasing the amount of light to be transmitted by) the right-eye optical filter 121 in the same manner as the synchronizing signal (2).

In the case where a pre-subfield is provided for the purpose of increasing reliability of light emission of- subfields following the pre-subfield, and the weight of the pre-subfield is smaller than the subfields, that is, the effect on an image to be displayed is small, it is preferable that the synchronizing signal transmitting unit 413 generate and output the synchronizing signal (2) or (4) for closing one of the optical filters 123 corresponding to the preceding frame before the light emission of the pre-subfield, and the synchronizing signal (1) or (3) for opening one of the optical filters 123 corresponding to the frame after the end of the light emission of the pre-subfield. This allows the viewer to have an image free from effect due to light emission of the pre-subfield.

In addition, in the case where a pre-subfield is provided for the purpose of increasing reliability of light emission of subfields following the pre-subfield, and the synchronizing signal (1) or (3) for opening one of the optical filters 123 corresponding to the frame is generated and transmitted after the light emission of the pre-subfield ends, it is preferable that the black level of the output image signal (the level at which the signal indicates a brightness of zero) be raised. That is, the basal luminance level at which a signal is at a level of zero and indicates black is raised. For example, luminance equivalent to light emission of the pre-subfield blocked by the optical filters 123 may be compensated by raising the black level to the luminance of the pre-subfield. This prevents relative decrease in luminance of the image (darkening of the image) in the period of the field.

In the case where a pre-subfield is provided not only for the above purpose but also for the purpose of contributing to presentation of the image, in other words, where light emission of the pre-subfield is intended for contributing to the brightness of the image to be displayed, the control may be modified suitably for the purpose. For example, the synchronizing signal (1) or (3) may be generated and output prior to the light emission of the pre-subfield so that the light emission due to the light emitted during the pre-subfield is shown to the viewer. In this case, the image signal processing IC 307 controls light emission and non-light emission of the pre-subfield depending on the brightness of each field. That is, light may not be emitted during a pre-subfield.

In addition, the synchronizing signal transmitting unit 413 may properly control timing of generating and outputting synchronizing signals (1), (2), (3) and (4) according to characteristics of a scene detected by the image characteristics information detecting unit 1810 as shown in Embodiment 4.

For example, in a relatively dark scene, the synchronizing signal (1) or (3) for opening the optical filter 123 may be generated and output prior to light emission of the pre-subfield so that the viewer can view an image in which the amount of emitted light during the pre-subfield is included. On the other hand, it is also possible to prevent the light emitted during the pre-subfield from being shown to the viewer in an excessively bright scene. That is, the manner in which times for controlling generation and output of the signals may be changed in order to include or exclude light emitted during a pre-subfield for each scene.

As described above, displaying a suitable stereoscopic image using subfield drive is achieved by providing light emission of pre-subfields prior to light emission of subfields and controlling timing of generating and outputting synchronizing signals according to the method of controlling light emission of subfields or characteristics of each scene.

When receiving the synchronizing signals from the image display device 100, the pair of image viewer glasses 120 controls the right and left optical filters 123 according to the synchronizing signals received, allowing the viewer to view a preferable stereoscopic image.

The viewer is thus allowed to view a preferable stereoscopic image even when the image display device 100 displays the stereoscopic image using subfield drive.

(Other Embodiments)

Although the present invention is described based on the above embodiments, it should be understood that the present invention is not limited to the embodiments. The following is also within the scope of the present invention.

Specifically, each of the apparatuses is a computer system including a microprocessor, a ROM, a RAM, a hard disk unit, a display unit, a keyboard, and a mouse. The RAM or the hard disk unit stores a computer program. Each of the apparatuses performs its functions by operating according to the computer program. Here, the computer program includes a combination of instruction codes to indicate instructions to the computer so that the computer performs predetermined functions.

All or part of the components of each of the apparatus may be composed of a system large scale integration (LSI). A system LSI is a super-multifunctional LSI manufactured by integrating a plurality of components on a chip. Specifically, a system LSI is a computer system including components such as a microprocessor, a ROM, and a RAM. The RAM stores a computer program. The microprocessor operates according to the computer program, so that the system LSI performs its functions.

All or part of the components of each of the apparatus may be composed of an IC card or a module of a single unit attachable to the apparatus. Each of the IC card and the module is a computer system including components such as a microprocessor, a ROM, and a RAM. Each of the IC card and the module may include the super-multifunctional LSI. The microprocessor operates according to the computer program, so that the IC card or the module performs its functions. Each of the IC card and the module may be tamper-proofed.

The present invention may be implemented as a method described above. In addition, the present invention may be implemented as a computer program which performs the method using a computer or as a digital signal containing a computer program.

In addition, the present invention may be implemented as a computer program or a digital signal recorded on a computer-readable recording medium such as a flexible disk, a hard disk, a CD-ROM, an MO, a DVD, a DVD-ROM, a DVD- RAM, a Blu-ray Disc (BD), or a semiconductor memory. The present invention may be a digital signal recorded on any of the recording media.

In addition, the present invention may be implemented as a computer program or a digital signal transmitted through an electric communication line, a wireless or wired communication line, a network typified by the Internet, data broadcasting, or the like.

In addition, the present invention may be implemented as a computer system including a microprocessor and a memory. The memory stores the computer program and the microprocessor operates according to the computer program.

The program or the digital signal may be recorded on a recording medium for transportation or transmitted through a network or the like so that the program is executed on another independent computer system.

These embodiments and variations may be implemented in combination.

Although the embodiments of the present invention are described with reference to the drawings, the present invention is not limited to the embodiment shown in the drawings. Various modifications and variations of the embodiments shown in the drawings are covered by the present invention as long as they are the same as or equivalent to the present invention.

The present invention is applicable to an image display device which displays an image, and a pair of image viewer glasses to be used for viewing the image displayed by the image display device. In particular, the present invention is applicable to a stereoscopic image display device which alternately displays right and left images with parallax therebetween, and an image display device, a pair of image viewer glasses or an image viewing system which alternately displays a plurality of images (or content items) per frame.

What is claimed is:

1. An image signal processing apparatus which alternately outputs frames included in a first image to be displayed to one of a left eye and a right eye of a viewer and frames included in a second image to be displayed to the other one of the left eye and the right eye not to be displayed the first image, and transmits, to a pair of image viewer glasses, a synchronizing signal for controlling a timing of opening and closing of optical filters of the pair of image viewer glasses so as to allow the viewer to see each of the output frames through a corresponding one of the left eye and the right eye, the optical filters opening and closing independently from each other and each facing a corresponding one of the left eye and the right eye of the viewer, the image signal processing apparatus comprising:

a persistence amount detecting unit configured to detect a persistence amount indicating an effect of a first frame on a second frame output immediately after the first frame, the first frame being included in the first image, and the second frame being included in the second image; and an optical-filter adaptive control unit configured to generate the synchronizing signal indicating timing of opening and closing of the optical filter corresponding to the second frame, the timing being changed, based on the persistence amount detected by the persistence amount detecting unit, to reduce the persistence amount; and a crosstalk cancelling unit configured to reduce persistence between the first frame and the second frame, wherein the persistence amount detecting unit is configured to calculate, as the persistence amount, an accumulated value by accumulating absolute values of values smaller than a predetermined threshold among pixel values of respective pixels of the second frame after the reduction of the persistence by the crosstalk cancelling unit, and the persistence amount detecting unit is configured to detect an amount of the persistence remaining in the second frame after the reduction of the persistence by the crosstalk cancelling unit.

* * * * *